(12) United States Patent
Akisada et al.

(10) Patent No.: US 6,400,364 B1
(45) Date of Patent: *Jun. 4, 2002

(54) IMAGE PROCESSING SYSTEM

(75) Inventors: Hirokazu Akisada, Tokyo; Shunichi Tamai, Chiba, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,310

(22) Filed: May 27, 1998

(30) Foreign Application Priority Data

May 29, 1997 (JP) ............................... 9-154306

(51) Int. Cl.$^7$ ............................... G06T 15/10
(52) U.S. Cl. ..................... 345/427; 345/420; 345/757
(58) Field of Search ................................ 345/419, 425, 345/427, 420, 757

(56) References Cited

U.S. PATENT DOCUMENTS 5,446,834 A * 8/1995 Deering ..................... 345/427
5,999,185 A * 12/1999 Kato et al. ................. 345/420

* cited by examiner

Primary Examiner—Cliff N. No
Assistant Examiner—Kimbinh T. Nguyen
(74) Attorney, Agent, or Firm—Fitzpatrick, Cella, Harper & Scinto

(57) ABSTRACT

A three-dimensional image processing apparatus in which a three-dimensionally shaped model, a viewpoint (a camera) and a screen are set in a virtual the apparatus detects a two-dimensional position of a viewpoint of an operator and moves the screen according to the detected viewpoint position to map the three-dimensional shape of the model over the screen as viewed from the detected viewpoint position.

19 Claims, 23 Drawing Sheets

(FIXED SCREEN)

SCREEN DIRECTION VECTOR (ROTATION SCREEN)

SCREEN DIRECTION VECTOR (ROTATION SCREEN)

SCREEN DIRECTION VECTOR (ROTATION SCREEN)

SCREEN DIRECTION VECTOR

FIG. 18A

```
⎧ <COORDINATE DATA>  (VERTEXES ARE SEQUENTIALLY NUMBERED FROM TOP)
⎪
⎪  8                      · · · · NUMBER OF ALL VERTEXES
⎪  0.0    0.0    0.0
⎪  1.0    0.0    0.0      · · · · x, y, z COORDINATES OF EACH VERTEX
⎨  1.0    1.0    0.0
⎪  0.0    1.0    0.0
⎪  0.0    0.0   -1.0
⎪  1.0    0.0   -1.0
⎪  1.0    1.0   -1.0
⎩  0.0    1.0   -1.0
```

FIG. 18B

```
⎧ <SURFACE LOOP DATA>
⎪  6                  · · · NUMBER OF SURFACE OF OBJECT
⎪  4                  · · · NUMBER OF VERTEXES OF FIRST SURFACE LOOP
⎪  1  2  3  4         · · · EXAMPLE OF VERTEX NUMBER OF FIRST SURFACE
⎪  4
⎪  5  6  7  8
⎪  4
⎨  4  3  7  8                 ·
⎪                             ·
⎪  1  5  8  4                 ·
⎪  4
⎪  1  2  6  5
⎪  4                  · · · NUMBER OF VERTEX NUMBER OF SIXTH SURFACE
⎩  2  6  7  3         · · · EXAMPLE OF VERTEXES OF SIXTH SURFACE LOOP
```

DISPLAY IMAGE
(DEVICE COORDINATE SYSTEM)

IMAGE PROCESSING SYSTEM

BACKGROUND OF THE INVENTION

1. Field of the Invention

The present invention relates to image processing in a virtual reality space.

2. Related Background Art

The following methods are known which realize simulation of a virtual world in a virtual reality (techniques of providing human sensory organs with information generated by a computer to allow pseudo-experiences of human activities in an imaginary world or in a remote space).

For example, a three-dimensional (3D) position/direction detector (e.g., FASTRAK of 3SPACE Corporation measures a 3D position and an Eulerian angle in a real space by magnetic conversion techniques) attached to a head of a player who experiences a virtual reality detects geometrical data. In accordance with this data, a computer calculates an image of a previously input model (3D configuration data of an object) while considering its spatial and geometrical position. This calculated image is displayed on a head mount display, e.g., i-glasses of Virtual-io Corporation to make the player experience virtual world simulation.

In such a system realizing a virtual reality, an image to be viewed by a player is generally generated by 3D computer graphics (CG) to be described hereinunder.

In 3D CG for forming an image representing a 3D object, two main operations "modeling" and "rendering" are generally performed to form an image.

Modeling is an operation of supplying a computer with data such as a shape, color, surface property and the like of an object to be displayed as an image. For example, if a human image is to be formed, data such as what surface shape of the human image is, what color of which area of the face is, what light reflectivity is, and the like, is generated and stored in the format usable by the next rendering operation. Such a collection of data is called an object model.

For example, in modeling a cubic shape such as shown in FIG. 17, first a modeling coordinate system is formed which has as its origin, one vertex of the cube. Coordinate data of eight vertexes and surface loop data of the cube are determined in the coordinate system, for example, as shown in FIGS. 18A and 18B. A collection of coordinate data and surface loop data is used as model data of the object.

Rendering is an operation of generating an image of an object as viewed from a certain position, after the model is formed. In order to perform rendering, therefore, in addition to the model, conditions of a viewpoint and illumination are required to be considered. The rendering operation is divided into four works including "projection conversion", "shielded surface erasing", "shading" and "devising for reality".

With "projection conversion", the position on the screen of each coordinate value representing a model as viewed from a position of a viewpoint is calculated to convert it into a coordinate value on the screen. FIG. 19 shows four coordinate systems used for the projection conversion. The shape data of an object defined in the modeling coordinate system is first converted into shape data in a world coordinate system (used for the model representing an object). Thereafter, viewing conversion (visual field conversion) is performed to direct a selected camera to one of various directions and take the image of the object. In this case, the data of the object represented in the world coordinate system is converted into the data in a viewpoint coordinate system. For this conversion, a screen (visual field window) is defined in the world coordinate system. This screen is a final projection or picture plane of the object. The coordinate system for defining this screen is called a UVN coordinate system (screen coordinate system). If all objects in front of the viewpoint are drawn, a calculation time may become unnecessarily long and it is therefore necessary in some cases to determine a working area. The working area is called a viewing volume (visual field space). This determination process is called clipping. In the viewing volume, the surface nearest to the camera is called a near or front clipping plane and the surface remotest from the camera is called a far or rear clipping plane. The visual field conversion is performed by moving the screen in one of various directions. After the visual field conversion is performed, a cross point on a picture plane (screen) of a line extending between the viewpoint and each point of the 3D shape of the object in the space is calculated to obtain an image of the object projected upon the screen as shown in FIG. 20. In this case, however, the image is formed through central projection which has a definite distance between the viewpoint and the picture plane. With this projection conversion, therefore, the data in the viewpoint coordinate system is converted into the data in the UVN coordinate system.

Next, the "shielded surface erasing" is performed to judge which area of the model can be viewed or cannot be viewed from the present viewpoint. Typical approaches to the shielded surface erasing algorithm are a Z buffer method and a scan line method. After it is determined by the shielded surface erasing which area can be viewed, illumination is taken into consideration to judge which area is viewed in what color and at what brightness. The determined color is drawn on the screen or pixels. This process is the shading work.

The "devising of reality" work is generally performed at the end of rendering. This work Is performed because an image formed by the "projection conversion", "shielded surface erasing" and "shading" becomes much different from a real object and gives no interest to the player. The reason for this is that these processes are performed on the assumption that the surface of an object is an ideal flat plane or a perfectly smooth curve plane capable of being represented by formulas or that the color of each surface is the same over the whole area thereof. One typical method of avoiding this and making an image more realistic, is texture mapping. With this texture mapping, a prepared two-dimensional pattern is pasted (mathematically speaking, an image of the pattern is mapped over) on the surface of an object model in a 3D space. This process aims at making an object constituted of monotonous surfaces be viewed as if it has complicated surfaces. With this process, a simple cubic model can be viewed as a metal object or a stone object.

After the "projection conversion", "shielded surface erasing", "shading" and "devising of reality", an image of the object in the UVN coordinate system is finally converted into an image in a device coordinate system which is then displayed on the display device. One rendering process is completed in the above manner. FIG. 21 shows an image (with its background being drawn fully in black) which is an image projected on the screen shown in FIG. 20, converted into the image in the device coordinate system, and displayed on the display screen. The device coordinate system is used when pixels and dots of an image are displayed, and is assumed to be the coordinate system same as that of the display screen (a and b in FIG. 21 represent the numbers of pixels of the display screen).

In forming CG animation by giving a motion to an image (CG image) formed by the method described above, the two methods are mainly used.

With the first method, an object model is placed in a 3D space. Each time the illumination condition, viewpoint condition (position, direction, and angle of view of the viewpoint), the model shape and color and the like are changed slightly, to carry out rendering. After a series of animation images are formed or after each image is rendered, the images are recorded frame by a frame (frame-recorded) in a video tape recorder or the like. After all images are recorded, they are reproduced by a reproducing apparatus. With this method, a time required for image rendering may be prolonged in an allowable range (although depending on a time required for one image rendering and on a time required for forming all animation images). It is therefore possible to form a high quality image, by disposing a number of objects having complicated shapes on the display screen or by incorporating a rendering process, typically ray tracing, requiring a long calculation time. For example, such approaches are used for forming CG images of television advertisements, SF movies and the like.

The second method generates CG animation images by repetitively performing two processes at high speed, the two processes being a rendering process while changing the illumination condition, viewpoint condition, and the object model shape and color and a displaying process of displaying an image formed through the rendering process. This method is generally called real time CG rendering. The main feature of this method is a capability of an interactive process of controlling a motion of CG animation images in real time, by directly reflecting a user instruction upon the rendering. However, practicing this method greatly depends upon the performance of a computer, the amount of data of objects capable of being displayed on the display screen is limited, and only a simple and high speed rendering process can be used. Therefore, as compared to the first method, the quality of images formed by the second method is generally poor. This second method is used with various virtual reality systems, scientific and technical simulations, flight simulators for practicing air plane driving, racing games and fighting gates at game centers, and the like.

Next, a viewpoint detector will be described.

The present applicant filed a so-called viewpoint detector for detecting which area in a display screen of a personal computer or in a view finder screen of a video camera or a still camera a user views. The principle of the viewpoint detector will be described.

FIG. 22 is a plan view illustrating the principle of a viewpoint detecting method, and FIG. 23 is a side view illustrating the principle of the viewpoint detecting method. In FIGS. 22 and 23, 906a and 906b represent a light source such as a light emitting diode (IRED) for emitting infrared rays insensible to a user. The light sources 906a and 906b are disposed approximately symmetrically in the x-direction (horizontal direction) relative to an optical axis of a focussing lens 911, and disposed slightly lower (refer to FIG. 23) in the y-direction (vertical direction). The light sources illuminate an eyeball 908 of the user with diverted light. A fraction of illumination light reflected from the eyeball 908 of the user is focussed on an image sensor 912 by the focussing lens 911.

FIG. 24 is a schematic diagram of an image of an eyeball projected upon the image sensor 912. FIG. 25 is a diagram showing an output intensity of the image sensor 912.

The viewpoint detecting method will be described with reference to FIGS. 22 to 25.

Consider first the horizontal plane. As shown in FIG. 22, light radiated from one light source 906b illuminates the cornea 910 (refer to FIGS. 22 and 23) of the eyeball 908 of a viewer. A cornea reflection image (imaginary image) d (refer to FIGS. 22 and 24) formed by infrared rays reflected by the surface of the cornea 910 is converged by the focussing lens 911 and focussed at a position d' (refer to FIG. 22) of the image sensor 912. Similarly, light radiated from the other light source 906a illuminates the cornea 910 (refer to FIGS. 22 and 23) of the eyeball 908 of the viewer. A cornea reflection image (imaginary image) e (refer to FIGS. 22 and 24) formed by infrared rays reflected by the surface of the cornea 910 is converged by the focussing lens 911 and focussed at a position e' (refer to FIG. 22) of the image sensor 912. Light fluxes reflected from the ends a and b (refer to FIGS. 22 to 24) of the iris 904 are focussed via the focussing lens 911 at positions a' and b' (refer to FIGS. 22 and 24) of the image sensor 912 to form the images of the ends a and b. If the rotation angle θ of the optical axis of the eyeball 908 relative to the optical axis of the focussing lens 911 is small, a number of x-coordinate values xa and xb of the ends a and b of the iris 904 can be obtained on the image sensor 912 (x symbols in FIG. 24). The iris center xc is calculated by the least square method applied to a circle. The rotation angle θx relative to the optical axis of the eyeball 908 is given by:

$$oc \times \sin \theta x = xc - xo \quad (1)$$

where xo is the x-coordinate value of the center o of the radius of curvature of the cornea 910.

If a predetermined correction value δx is applied to the middle point k between the cornea reflection images d and e, the iris center is given by:

$$xk = (xd + xe)/2$$

$$xo = (xd + xe)/2 + \delta x \quad (2)$$

The correction value δx is determined geometrically by using the apparatus mount conditions, a distance to the eyeball and the like, the calculation method being omitted.

The equation (1) is substituted into the equation (2). Then, θx is given by:

$$\theta x = \arcsin[[xc\{(xd + xe)/2 + \delta x\}]/oc] \quad (3)$$

The coordinate value of each feature point projected on the image sensor 912 is affixed with ' (dash) to obtain:

$$\theta x = \arcsin[[xc'\{(xd' + xe')/2 + \delta x'\}]/oc/\beta] \quad (4)$$

where β is a magnification factor determined from a distance sze between the focussing lens 911 and eyeball 908, which is obtained in actual as the function of a distance |xd'−xe'| between the cornea reflection images d and e.

Next, consider the vertical plane shown in FIG. 23. The cornea reflection images d and e formed by the two light sources 906a and 906b are focussed at the same position which image is represented by i. A method of calculating the rotation angle θy of the eyeball 908 in the vertical direction is generally the same as the horizontal plane, excepting that the equation (2) becomes different as:

$$yo = yi + \delta y \quad (5)$$

where yo is the y-coordinate of the center o of the radius of curvature of the cornea. The correction value δy is determined geometrically by using the apparatus mount conditions, a distance to the eyeball and the like, the calculation method being omitted.

Therefore, the rotation angle θy of the eyeball 908 in the vertical direction is given by:

$$\theta y = \arc\sin[[yc'-(yi'+\delta y')]/oc/\beta] \quad (6)$$

The position coordinates (xn, yn) on the screen such as a view finder on the horizontal and vertical planes are given by:

$$xn = m \times \arc\sin[[xc'-\{(xd'+xe')/2+\delta x'\}]/oc/\beta] \quad (7)$$

$$yn = m \times \arc\sin[[yc'-(yi'+\delta y')]/oc/\beta] \quad (8)$$

where m is a constant determined by the view finder optical system.

As seen from FIGS. 24 and 25, in detecting the iris edges, a rise edge (xb') and a fall edge (xa') of an output waveform of the image sensor 912 are used. In detecting the coordinate values of the cornea reflection images d and e, a sharp rise edge (xe') and a sharp fall edge (xd') are used.

Next, an example of a personal computer system with a viewpoint detecting function will be described.

FIG. 26 is a schematic diagram showing an example of the structure of a personal computer system having a viewpoint detecting function. The personal computer system shown in FIG. 26 is constituted of a personal computer unit 1008, a head mount display 1006 used for a user to view the screen of the personal computer unit 1008, and an external monitor 1009 used for the user or other persons to view the screen of the personal computer unit 1008. The head mount display 1006 is fixed to the position near the eyes of the user, by goggles, an eye glass frame or the like.

The head mount display 1006 is constituted of: a display element 1002 such as an liquid crystal display (LCD); a specific prism 1003 for realizing a magnified observation system; a viewpoint detection circuit 1064 for detecting a viewpoint of the eye 1005 of a viewer; a display circuit 1007 for displaying a personal computer screen on the display element 1002; infrared light emitting diodes 1060 and 1061 for radiating infrared toward the eye 1005 of the viewer; focussing lenses 1062a and 1062b for focussing infrared rays; and a photoelectric conversion element (image sensor) 1063 for converting the infrared rays focussed by the focussing lenses 1062a and 1062b into an electric signal. The viewpoint detection circuit 1064 detects a subject point or viewpoint of the viewer on the display element in accordance with the image of the eye 1005 on the photoelectric conversion element 1063.

An optical operation of the observation system of the head mount display 1006 will be described. Light from the display element 1002 is refracted by a third optical action plane c and transmitted. The transmitted light is then totally reflected by a first optical action plane a, and reflected by a second optical action plane b. Thereafter, the light is again refracted by the first optical action plane a and transmitted to have an expansion angle (converging angle, parallel light fluxes) suitable for the dioptic power of the observer to be incident upon the eye 1005 side of the observer. A line coupling the eye 1005 of the observer and the center of the display element 1002 is used as a reference optical axis. The dioptic power of the observer can be adjusted by moving the display element 1002 in parallel to the optical axis of the prism 1003. In order to realize a telecentric optical system by correcting image characteristic and distortion, the three optical action planes of the prism 1003 are preferably configured by 3D curve planes having no rotation symmetry axes. In this example, the curve planes are symmetrical only to a plane parallel to the drawing sheet including the reference optical axis.

The optical operation of the viewpoint detecting system of the head mount display 1006 will be described next. Light radiated from the infrared light emitting diodes 1060 (two pieces in the depth direction) for bare eyes and infrared light emitting diodes 1061 (two pieces in the depth direction) for eyes with eye glasses illuminates the viewer eye 1005 along a direction different from the optical axis of the viewpoint detecting system, via openings 1012, 1013, 1014 and 1015 formed in the second optical action plane b. The illumination light is reflected and scattered by the cornea 910 and iris of the viewer. The light reflected by the cornea 910 forms the cornea reflection images d and e, whereas the light scattered by the iris forms the iris image. The light is also focussed on the image sensor 1063 by the focussing lenses 1062a and 1062b via an opening 1010 formed in the second optical action plane b. From an image of the eye 1005 of the viewer obtained by the image sensor 1063, the feature point data can be derived by the viewpoint detection circuit 1064 which is configured to perform the viewpoint detecting principle described previously.

The focussing lens system is configured by the two focussing lenses 1062a and 1062b. The focussing lens 1062b in particular is a wedge-shape lens which allows the focussing lens system to be configured by a less number of lenses and is suitable for a compact lens system. By providing a slanted plane of the focussing lens 1062b with a radius of curvature, eccentric aberration generated at the second optical action plane b can be effectively corrected. If the focussing lens system is provided with at least one plane not curved, it is effective for correcting the focussing performance outside of the optical axis. If an aperture of the focussing lens system is disposed near at the opening formed in the second optical action plane b, the opening 1010 can be made narrow so that an inside missing of the observation system can be prevented effectively. The opening and the aperture are preferably made coincident. If the opening is set smaller than 2 mm, this opening becomes smaller than the iris of the eye 1005 of the viewer so that the inside missing of the observation system can be prevented more effectively. Light for illuminating the eye 1005 of the viewer is infrared light which has a low luminous sensitivity. If the focussing lens system is provided with at least one lens for cutting visual light, a viewpoint detection precision can be improved.

FIG. 27 is a diagram showing a side view of the prism 1003. Although the second optical action plane b is provided with a reflection mirror coating, this coating is not formed at the openings of the focussing lens 1062a and 1062b and infrared light emitting diodes 1060 and 1061 (opening 1010 for focussing, openings 1012 and 1013 for infrared emitting diodes for bare eyes, openings 1014 and 1015 for infrared light emitting diodes for eyes with eye glasses). As described earlier, these openings 1010, 1012 to 1015 are so small that the view finder optical system is not affected, and the size is preferably 2 mm or smaller.

The openings 1010, 1012 to 1015 are formed in the mirror coating area, and the infrared light emitting diodes 1060 and 1061 as the light illumination sources are disposed on the side opposite to the eye 1005 of the viewer. Therefore, even if the prism 1003 has a high reflectivity to realize a broad visual field, the eye 1005 of the viewer can be properly illuminated at the height level approximate to the eye position.

The infrared light emitting diodes 1060 and 1061 are disposed at different positions for discriminating between bare eyes and eyes with eye glasses. The two infrared light emitting diodes 1060 for bare eyes are disposed right and left symmetrically to the optical axis in a narrow width at the same height slightly lower than the optical axis. On the other hand, the two infrared light emitting diodes 1061 for eyes with eye glasses are disposed right and left symmetrically to the optical axis in a broad width at the same height fairly lower than the optical axis. There are three reasons for this layout. One reason is to illuminate the eye detection area as uniformly as possible in order to ensure the good illumination conditions irrespective of a distance to the eyeball. The second reason is to set the infrared light emitting diodes 1060 for bare eyes higher than the diodes 1061 for eyes with eye glasses in order not to make the cornea reflection images d and e be intercepted by eye lids. The third reason is to set the infrared light emitting diodes 1061 for eyes with eye glasses more spaced in the right and left directions and the height level than the diodes 1060 in order to direct ghost images of the infrared rays reflected by the eye glasses to the peripheral area having less influence upon the viewpoint detection. Discrimination between an eyeball and an eye glass is conducted through calculation of a distance between the eyeball and prism 1003 by using the distance |xd'−xe'| between the cornea reflection images d and e.

The viewpoint detection circuit 1064 detects a viewpoint of the viewer on the display element 1002 from an image of the eye 1005 of the viewer on the image sensor element, in accordance with the above-described viewpoint detecting principle.

Next, the personal computer unit will be described.

In FIG. 26, reference numeral 1008 represents the personal computer unit. Reference numeral 1814 represents a central processing unit (CPU) which processes programs and data. Reference numeral 1813 represents a system bus interconnecting system devices. Reference numeral 1818 represents a memory controller for controlling a read-only memory (ROM) 1816 and a random access memory (RAM) 1817. Reference numeral 1812 represents a video graphic controller for controlling to display the contents written in a video RAM 1811 on the display. Reference numeral 1815 represents an accessory device controller for controlling a pointing device or a keyboard. In this example, the accessory device controller 1815 is connected to the viewpoint detection circuit 1064 of the head mount display 1006. Reference numeral 1819 represents an I/O channel for peripheral device control. In this example, the I/O channel 1819 is connected to the display circuit 1007 of the head mount display 1006.

In the personal computer unit constructed as above, viewpoint information of an operator detected with the viewpoint detection circuit 1064 of the head mount display 1006 can be used to scroll the screen or select a menu, in the similar manner as the information from the pointing device of the personal computer unit 1008 is used. Since the image on the screen of the personal computer unit can be displayed also on the external monitor 1009, persons other than the operator can see the image on the screen of the personal computer unit. If a single eye head mount display is used, the operator can see the image on the external monitor 1009.

In the above example, the screen (picture plane) set in the virtual space is a rectangular plane fixed relative to the viewpoint. An image is calculated from the model data of an object through image mapping of one point central projection over the screen. A spatial and geometrical shape of an object viewed by an operator is therefore simulations of a real world.

FIG. 8A illustrates the relation between a viewpoint, a screen, and three objects laterally disposed in line in the above example. For the simplicity of the drawing, the viewpoint is set just above the objects. The rendered image is shown in FIG. 8B. The images viewed by a viewer may have no artistic expression or less entertainment.

When an viewer wishes to emphasize a particular object, the color or size of the object is changed with the pointing device such as a mouse. In this case, the operator is required to move the mouse so that an intention of the operator cannot be reflected immediately.

SUMMARY OF THE INVENTION

The present invention has been made to solve the above problems. It is a first object of the invention to provide a virtual reality system and method capable of experiencing simulations of a virtual world having high artistic expressions and high entertainment.

It is a second object of the present invention to provide an image processing system capable of efficiently realizing a highly reliable and sophisticated process.

It is a third object of the present invention to provide a storage medium capable of smoothly controlling the virtual reality system as above.

In order to achieve the above objects, a preferred embodiment of the invention discloses an image processing method comprising: a modeling step of configuring three-dimensional shape data of an object; a viewpoint position detecting step of detecting a viewpoint position of a viewer intending to experience virtual reality; a viewpoint setting step of setting a viewpoint in a three-dimensional space; a screen setting step of setting a screen in a virtual space in accordance with viewpoint position data detected at the viewpoint position detecting step; a screen mapping step of mapping a scene over the screen, which scene is formed by model data of the object viewed at the viewpoint set at the viewpoint setting step while a spatial and geometrical position of the object is taken into consideration; an image generating step of mapping the scene mapped on the screen at the screen mapping step, over a device coordinate system; a video converting step of converting an image generated at the image generating step into a video signal; and a video display step of displaying an image converted at the video converting step.

In order also to achieve the above objects, a preferred embodiment of the invention discloses an image processing system comprising: modeling means for configuring three-dimensional shape data of an object; viewpoint position detecting means for detecting a viewpoint position of a viewer intending to experience virtual reality; viewpoint setting means for setting a viewpoint in a three-dimensional space; screen setting means for setting a screen in a virtual space in accordance with viewpoint position data detected by the viewpoint position detecting means; screen mapping means for mapping a scene over the screen, which scene is formed by model data of the object viewed at the viewpoint set by the viewpoint setting means while a spatial and geometrical position of the object is taken into consideration; image generating means for mapping the scene mapped on the screen by the screen mapping means, over a device coordinate system; video converting means for converting an image generated by the image generating means into a video signal; and video display means for displaying an image converted by the video converting means.

In order also to achieve the above objects, a preferred embodiment of the invention discloses a storage medium storing a program for controlling a virtual reality system realizing a virtual reality, the program comprising: a modeling module for configuring three-dimensional shape data of an object; a viewpoint position detecting module for detecting a viewpoint position of a viewer intending to experience virtual reality; a viewpoint setting module for setting a viewpoint in a three-dimensional space; a screen setting module for setting a screen in a virtual space in accordance with viewpoint position data detected by the viewpoint position detecting module; a screen mapping module for mapping a scene over the screen, which scene is formed by model data of the object viewed at the viewpoint set by the viewpoint setting module while a spatial and geometrical position of the object is taken into consideration; an image generating module for mapping the scene mapped on the screen by the screen mapping module, over a device coordinate system; a video converting module for converting an image generated by the image generating module into a video signal; and a video display module for displaying an image converted by the video converting module.

The other objects and features of the invention will become apparent from the following detailed description of the embodiments when read in conjunction with the accompanying drawings.

BRIEF DESCRIPTION OF THE DRAWINGS

FIGS. 18A and 18B are diagrams showing an example of general model data.

DETAILED DESCRIPTION OF THE PREFERRED EMBODIMENTS

Figure 1:
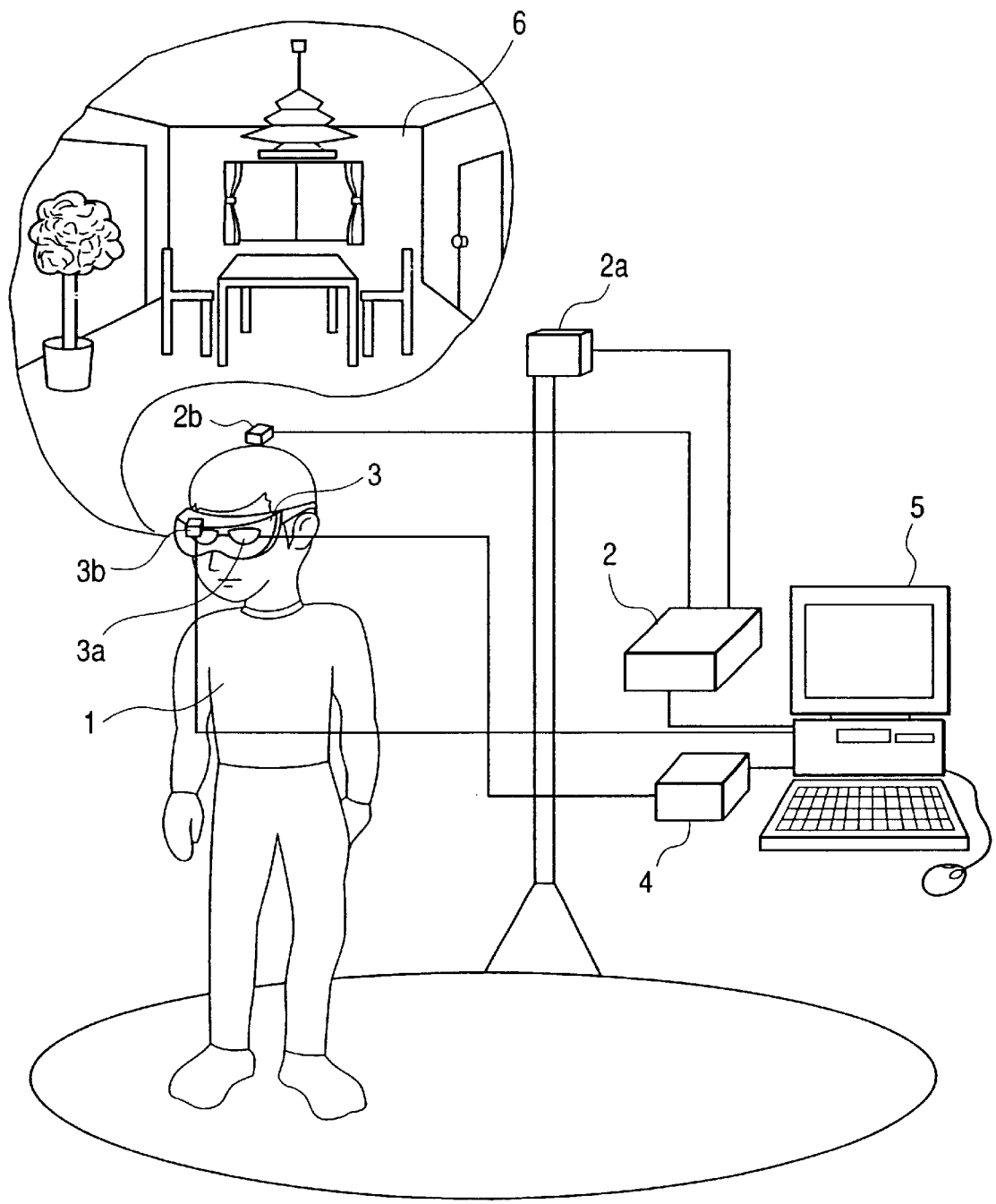
FIG. 1 is a schematic diagram illustrating a concept of a virtual reality system according to a first embodiment of the invention.

The first embodiment of the invention will be described with reference to FIGS. 1 to 4, 5A to 5D, 6, 7, 8A, 8B, 9A, 9B, 10A, 10B, 11A and 11B. FIG. 1 is a schematic diagram illustrating a concept of a virtual reality system of the first embodiment. In FIG. 1, reference numeral 3 represents a viewpoint input scouter (a kind of a head mount display) having a shape like a pair of eye glasses. A person 1 intending to experience virtual reality of this system mounts the viewpoint input scouter 3 like eye glasses to view an image on a monitor 3a in the scouter 3 and listen to sounds from attached earphones. A viewpoint detector 3b in the scouter 3 detects a viewpoint position of the user 1 and transmits detected data to a computer 5.

Reference numeral 2 represents a 3D sensor (position/direction sensor) connected with a transmitter 2a (fixed to a position near the user 1) and a receiver 2b (mounted on the head of the user 1). The 3D sensor 2 processes an amplitude of induction current in the receiver 2b generated by the magnetic field transmitted from the transmitter 2a to detect a spatial position (x, y, z) and directions (pitch, yaw, roll) of the user (head) 1. This calculated data is transmitted to the computer 5.

By using the 3D position and direction data of the user 1 in the real space detected with the 3D sensor 2, the computer 5 determines the position and direction of the viewpoint (camera) in the virtual space. Next, by using the viewpoint position data of the user 1 detected with the viewpoint detector 3b of the scouter 3, the position of the screen (picture plane) in the virtual space is set. A preset model (object) is transferred to the screen and an image (two-dimensional image) 6 representing a scene in the 3D virtual space is calculated. This image 6 is transmitted via a scan converter 4 to the monitor 3a in the scouter 3. The user 1 views this image 6 on the monitor 3a to experience simulations of the virtual space.

Figure 2:
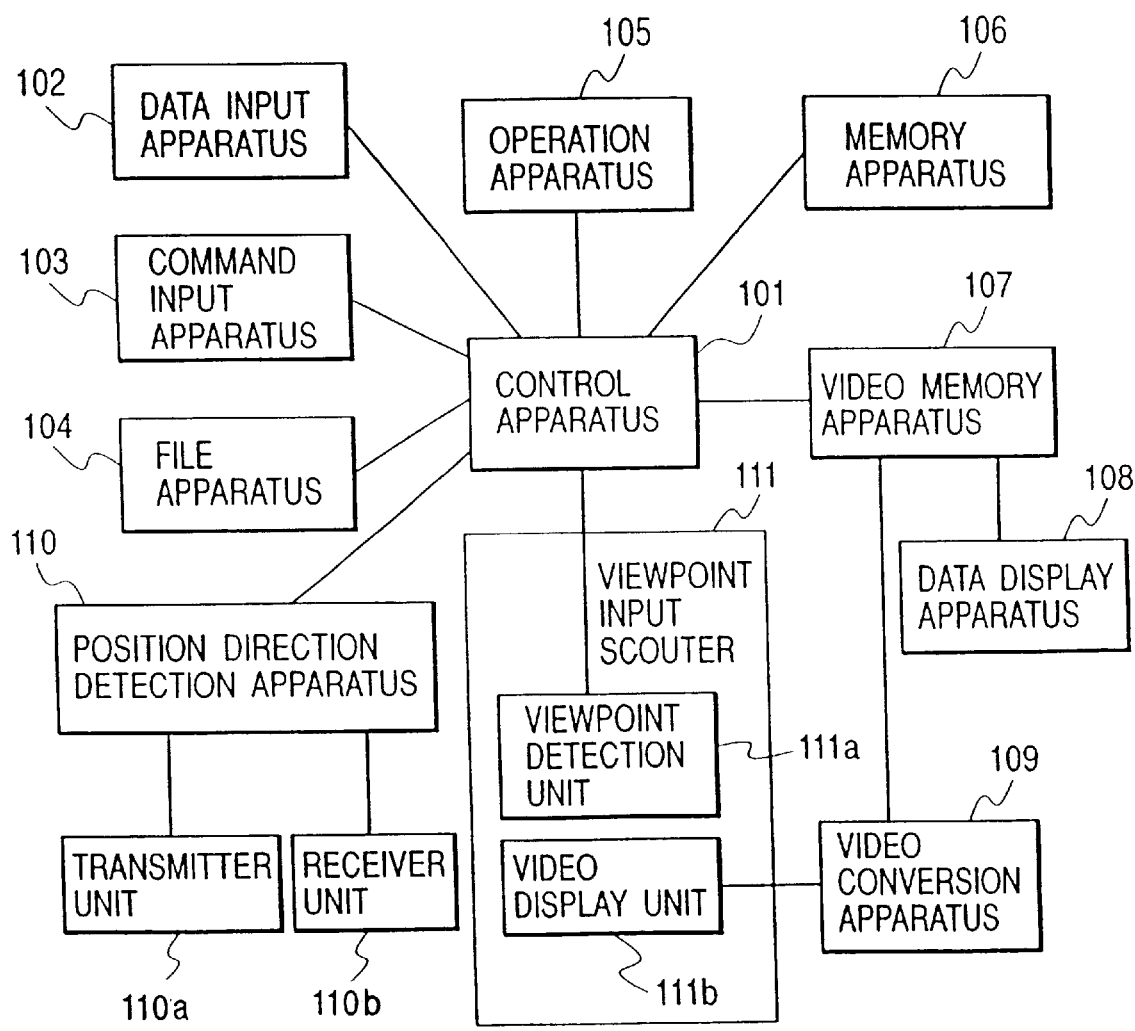
FIG. 2 is a block diagram showing the structure of the virtual reality system of the first embodiment.

FIG. 2 is a block diagram showing the structure of the virtual reality system of the first embodiment. In FIG. 2, reference numeral 101 represents a control apparatus for controlling all constituent elements of the system. Reference numeral 102 represents a data input apparatus such as a keyboard for inputting modeling data of an object, simulation data, and initial values such as a viewpoint condition. Reference numeral 103 represents a command input apparatus such as a mouse for designating the end and start of simulation. Reference numeral 104 represents a file apparatus such as a non-volatile memory for storing modeling data and the like. Reference numeral 105 represents an operation apparatus for renewing various variables and generating a 3D image. Reference numeral 106 represents a memory apparatus for storing various data such as modeling data of an object and a viewpoint condition, during the operation of the system. Reference numeral 107 represents a video memory apparatus for storing pixel values of an image after rendering. Reference numeral 108 represents a data display apparatus such as a cathode ray tube (CRT) monitor for displaying instruction information from the control apparatus 101, an image in the video memory apparatus 107, an instruction to the user, and data input by the user. The data display apparatus 108 is mainly used for data confirmation by a system operator. Reference numeral 109 represents a video conversion apparatus such as a scan converter for converting image data in the video memory apparatus into a video signal and outputting the video data. Reference numeral 110 represents a position/direction detection apparatus such as a magnetic sensor for detecting and outputting a position (x, y, z) and directions (pitch, yaw, roll) of the user experiencing virtual world simulation in the real world. This position/direction detection apparatus 110 is connected with a transmitter unit 110a (fixed to a position near the user 1) and a receiver unit 110b (mounted on the head of the user 1). Reference numeral 111 represents a viewpoint input scouter to be mounted on the user to experience virtual world simulation. The viewpoint input scouter 111 is constituted of a viewpoint detection unit 111a (for detecting viewpoint data of the user) and a video display unit 111b (for displaying a video signal from the video conversion apparatus 109).

Figure 3:
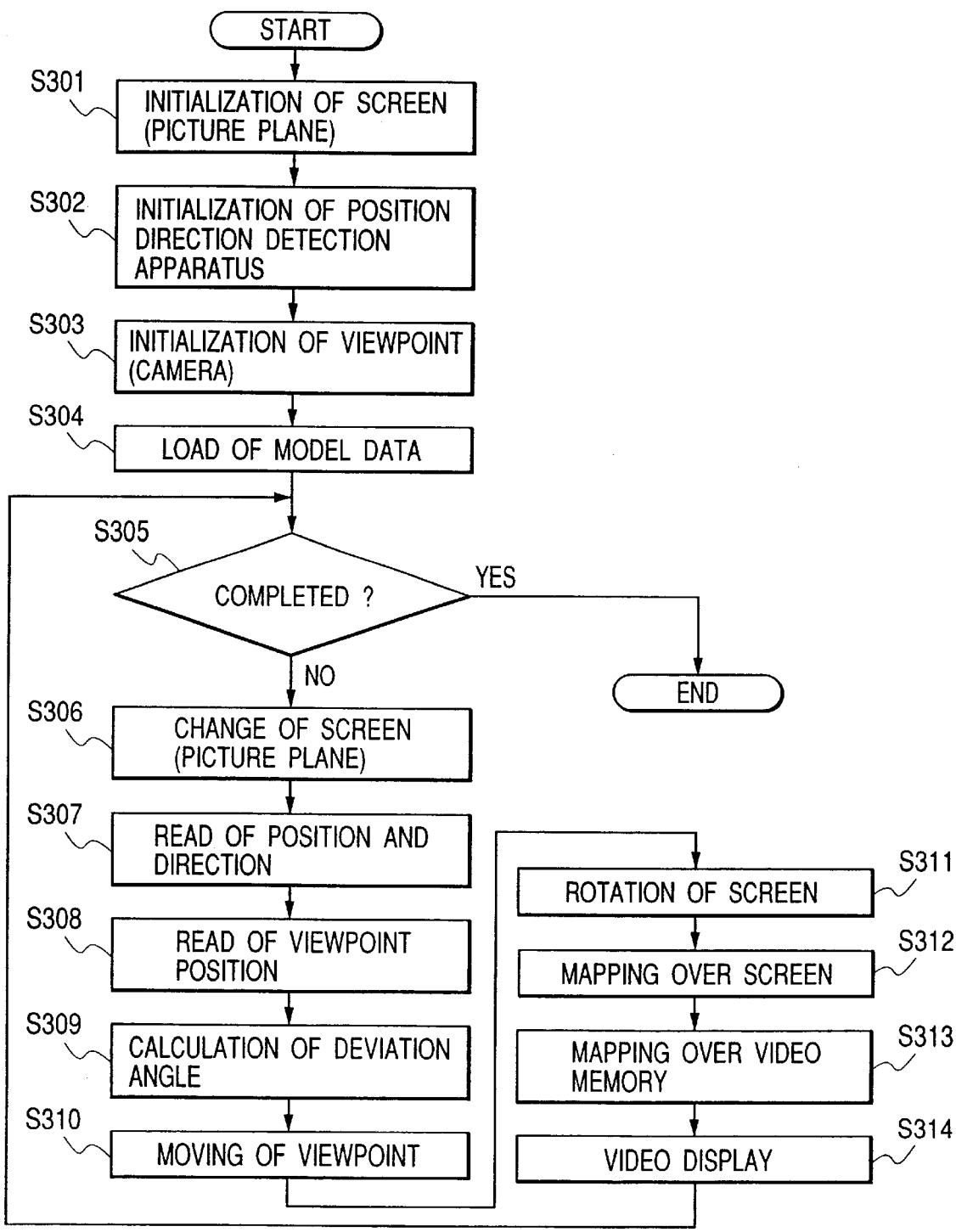
FIG. 3 is a flow chart illustrating the operation of a VR simulation process to be executed by the virtual reality system of the first embodiment.

Next, the operation of a VR simulation process to be executed by the virtual reality system of the first embodiment will be described with reference to the flow chart of FIG. 3. The flow chart illustrates the operation of the VR simulation process to be executed by the virtual reality system of the first embodiment.

As a user of this virtual reality system instructs a program start with the command input apparatus 103 such as a mouse, the VR simulation process starts.

Figure 4:
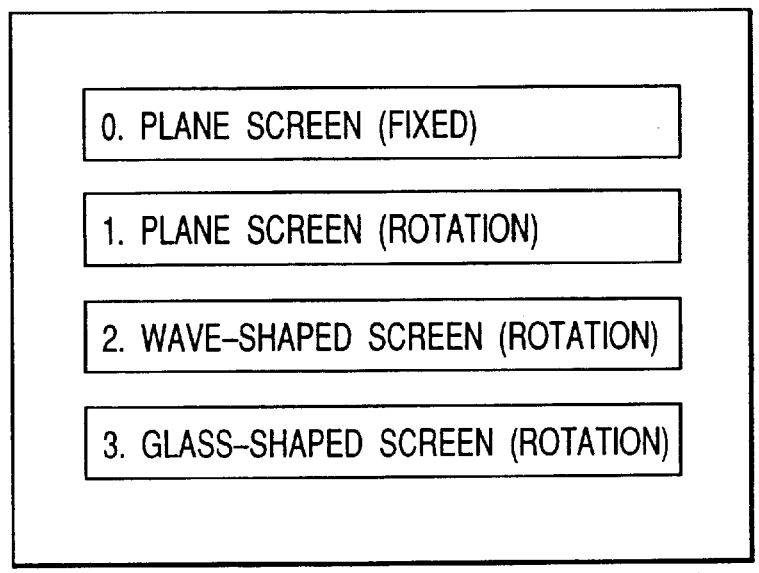
FIG. 4 is a diagram showing a menu when a screen selection mode is selected in the virtual reality system of the first embodiment.

At Step S301, the screen (picture plane) is initialized. Namely, upon reception of an instruction from the control apparatus 101, the data display apparatus 108 displays a menu such as shown in FIG. 4. The user selects a desired screen shape from the menu displayed on the data display apparatus 108 with the command input apparatus 103 or mouse, and thereafter depresses an unrepresented OK button. At this time, an ID (0 to 3) of the selected screen shape is substituted into a variable W. The screen shapes identified by IDs 0 to 3 are illustratively shown in FIGS. 5A to 5D.

Next, at Step S302 the position/direction detection apparatus 110 is initialized. Specifically, the user 1 of the virtual reality system stands upright at a proper position and looks at the front, with the viewpoint input scouter 111 and position/direction detection apparatus 110 being mounted. In this state, as the user instructs with the command input apparatus 103 or mouse, the position/direction detection apparatus 110 initializes the position and direction to an origin (0.0, 0.0, 0.0) and an original rotation is angle (0.0, 0.0, 0.0) without rotation. Next, at Step S303 upon reception of an instruction from the control apparatus 101, the operation apparatus 105 initializes the viewpoint (camera) to be set in the 3D virtual space, for example, to a position (0.0, 1.0, 0.0), a direction (0.0, 0.0, −1.0) (direction vector), and a view angle (0.8, 0.6) (horizontal and vertical).

Next, at Step S304 model data is loaded. Specifically, the control apparatus 101 reads the data from four model files (model 1 to model 4) stored in advance in the file apparatus 104, and loads the read data into the memory apparatus 106. It is assumed that each model data is written with the above-described coordinate value and plane loop data (the initial position of the model in the virtual space is added to the last of each model file). The models 1 to 4 have the following data by way of example.

Model 1
Coordinate Value Data
8 1:(−0.5, 0.5, 0.5), 2:(0.5, 0.5, 0.5), 3:(0.5, 0.5, −0.5), 4:(−0.5, 0.5, −0.5), 5:(−0.5, −0.5, 0.5), 6:(0.5, −0.5, −0.5), 7:(0.5, −0.5, 0.5), 8:(−0.5, −0.5, 0.5)

The numeral "8" at the left indicates that the shape of the model 1 is defined by eight coordinate values 1( ) to 8( ) in the 3D space. The contents in ( ) are the 3D coordinate values (x, y, z).

Plane Loop Data
6 (41234), (45876), (41562), (44378), (41485), (42673) (0.0, 1.0, −2.0)→initial value The numeral "6" at the left indicates that the shape of the model 1 is defined by six planes represented by ( ). The numeral in ( ) is a coordinate number in the 3D space.

For example, (41234) indicates a closed curve plane defined by 4:(−0.5, 0.5, −0.5), 1:(−0.5, 0.5, 0.5), 2:(0.5, 0.5, 0.5), 3:(0.5, 0.5, −0.5), and 4: (−0.5, 0.5, −0.5).

The front and back surfaces of the closed curve plane are discriminated by determining the front side of the closed curve plane as the front surface, when the plane is formed by the coordinate values 4, 1, 2, 3 and 4 in the counterclockwise direction.

Model 2
Coordinate Value Data
8 1:(−0.5, 0.5, 0.5), 2:(0.5, 0.5, 0.5), 3:(0.5, 0.5, 0.5), 4:(0.5, 0.5, −0.5), 5:(−0.5, −0.5, 0.5), 6:(0.5, −0.5, −0.5), 7:(0.5, −0.5, 0.5), 8:(−0.5, −0.5, 0.5)

Plane Loop Data
6 (41234), (45876), (41562), (44378), (41485), (42673) (0.0, 1.0, −2.0)→initial value Model 3
Coordinate Value Data
8 1:(−0.5, 0.5, 0.5), 2:(0.5, 0.5, 0.5), 3:(0.5, 0.5, −0.5), 4:(−0.5, 0.5, −0.5), 5:(−0.5, −0.5, 0.5), 6:(0.5, −0.5, −0.5), 7:(0.5, −0.5, 0.5), 8:(−0.5, −0.5, 0.5)

Plane Loop Data
6 (41234), (45876), (41562), (44378), (41485), (42673) (0.0, 1.0, −2.0)→initial value Model 4
Coordinate Value Data
4 (−5.0, 0.0, 0.0), (5.0, 0.0, 0.0), (5.0, 0.0, −10.0), (−5.0, 0.0, −10.0)
1 (42341) (0.0, 0.0, −5.0)→initial value In the embodiment, the color and surface texture of a model are not taken into consideration for the simplicity of description.

Next, at Step S305 upon reception of an instruction from the control apparatus 101, the command input apparatus 103 or mouse judges whether the user instructs an end of the VR simulation. If there is such an instruction, the VR simulation is terminated, whereas if not, the flow advances to Step S306.

At this Step S306, the shape of the screen (picture plane) is changed. Specifically, the command input apparatus 103 or mouse judges whether the user instructs a change of the shape of the screen (picture plane). If there is such an instruction, the control apparatus executes the process same as Step S304 to make the user select a new screen shape.

Next, at Step S307 upon reception of an instruction from the control apparatus 101, the position/direction detection apparatus 110 detects the position (x, y, z) and rotation angle (pitch, yaw, roll) of the head 1005 of the user 1, and stores the detected data in the memory apparatus 106.

Figure 6:
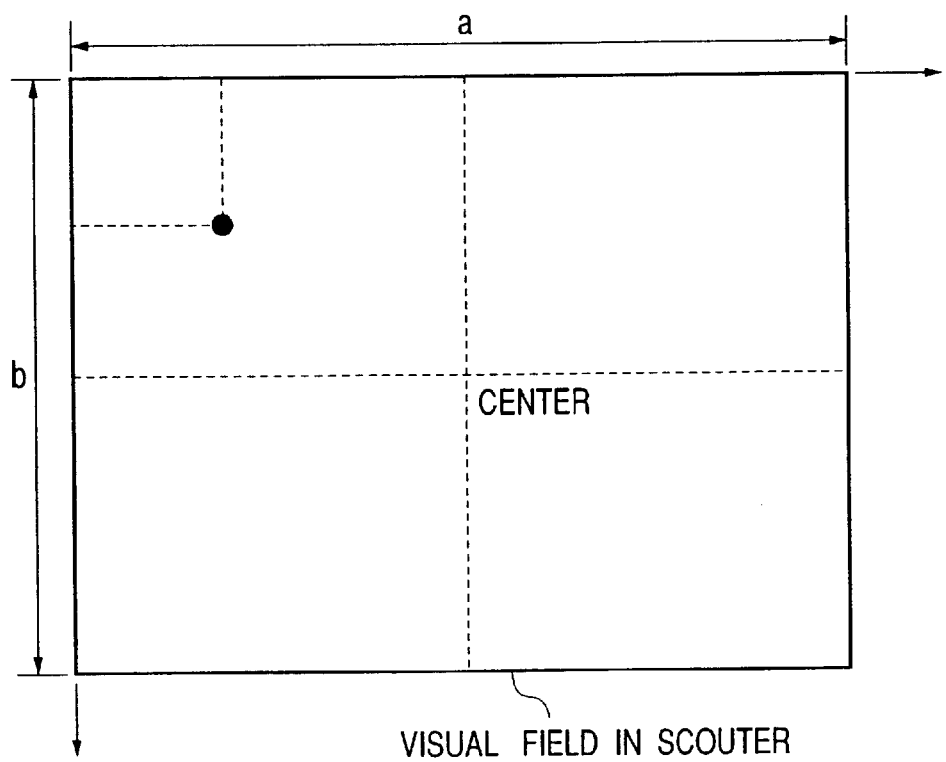
FIG. 6 is a diagram showing a visual field of a video display unit in a viewpoint input scouter of the virtual reality system of the first embodiment.
Figure 5A:
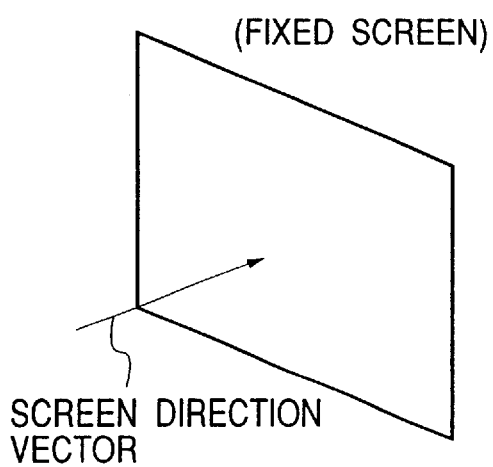
FIGS. 5A, 5B, 5C and 5D are diagrams showing four screens of the virtual reality system of the first embodiment.
Figure 5B:
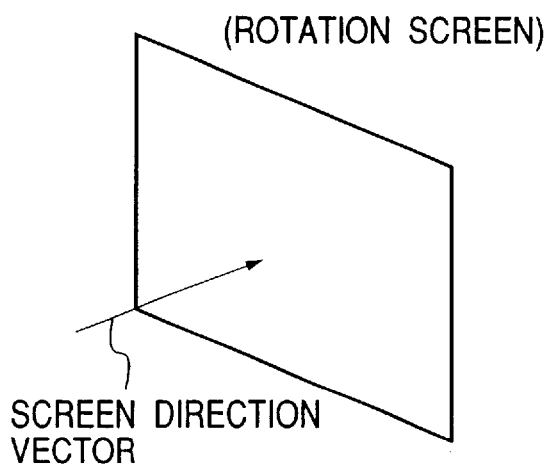
Figure 5C:
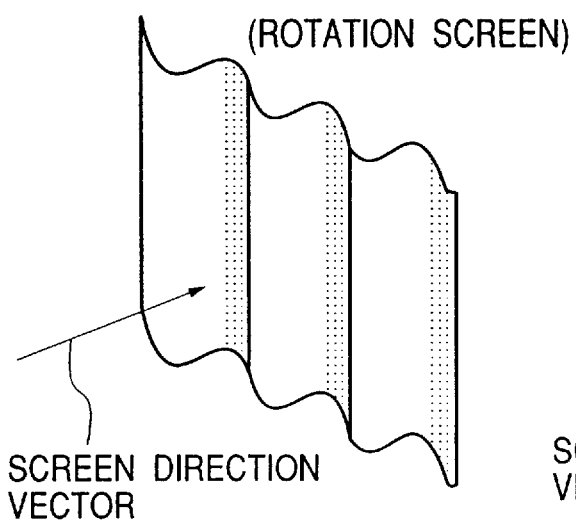
Figure 5D:
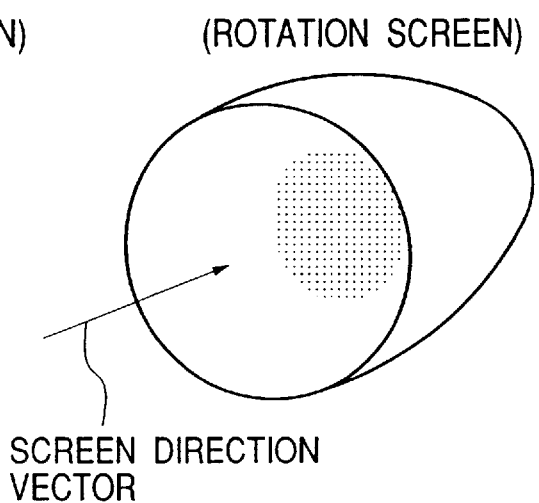
Figure 7:
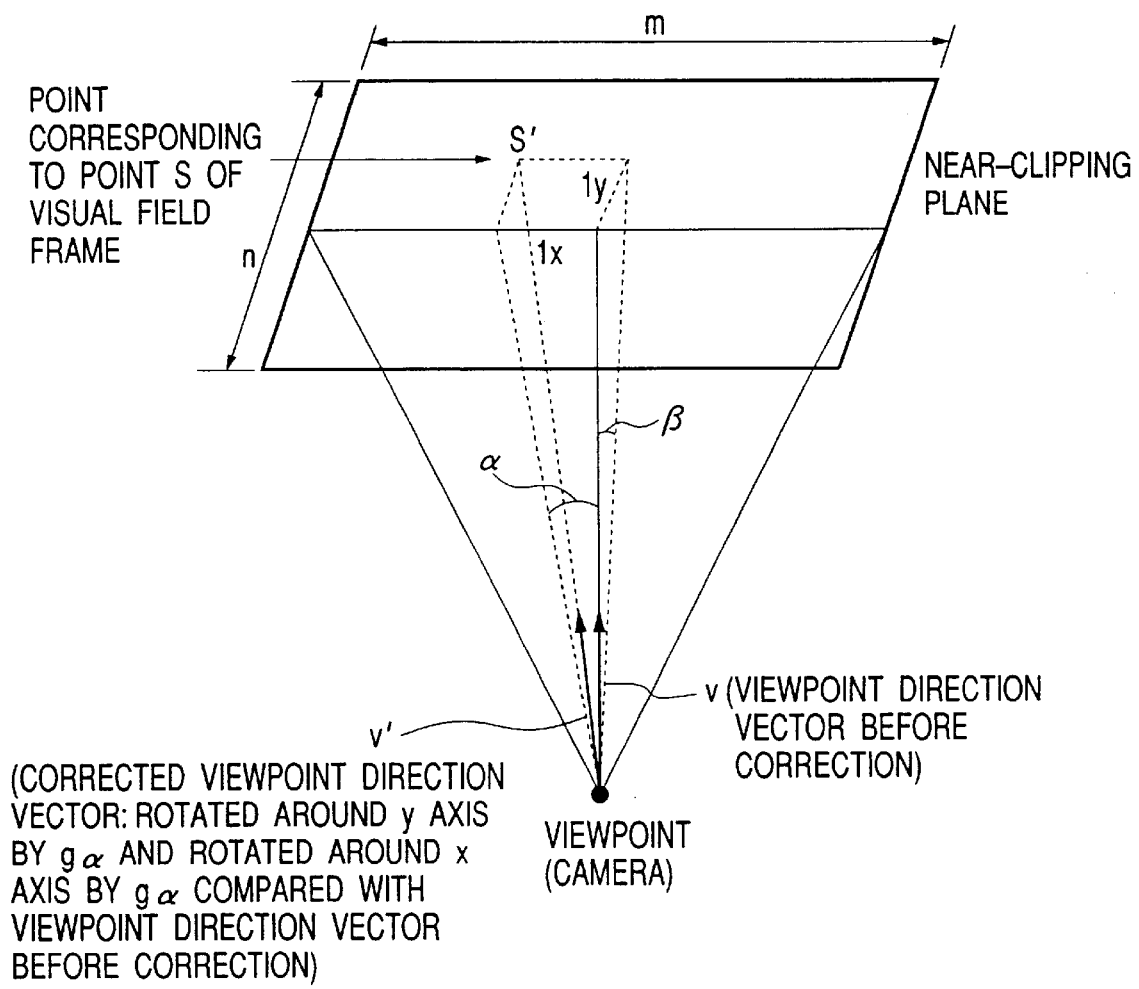
FIG. 7 is a diagram illustrating a near clipping plane and a viewpoint in the virtual reality system of the first embodiment.
Figure 8B:
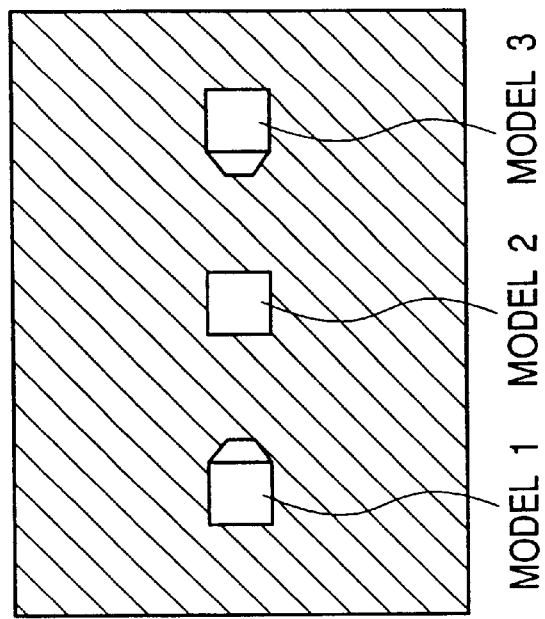
FIGS. 8A and 8B are diagrams illustrating projection to and images on the screen of the virtual reality system of the first embodiment.
Figure 8A:
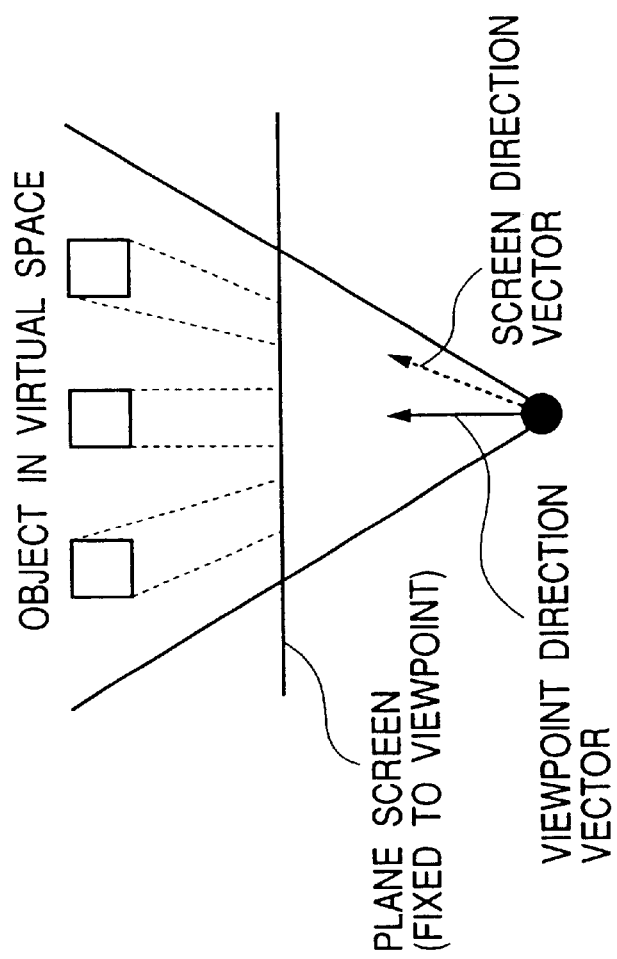
Figure 9B:
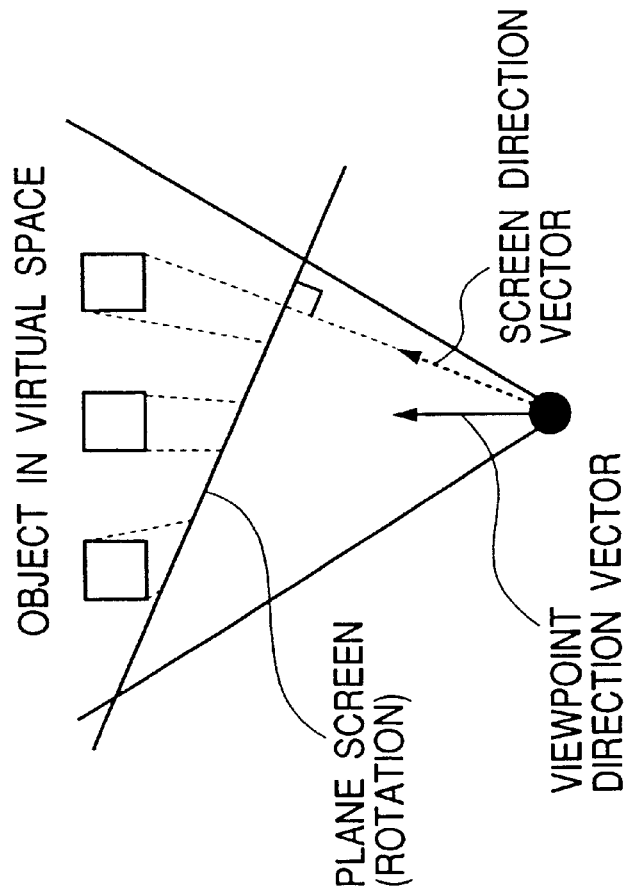
FIGS. 9A and 9B are diagrams illustrating projection to and images on the screen of the virtual reality system of the first embodiment.
Figure 9A:
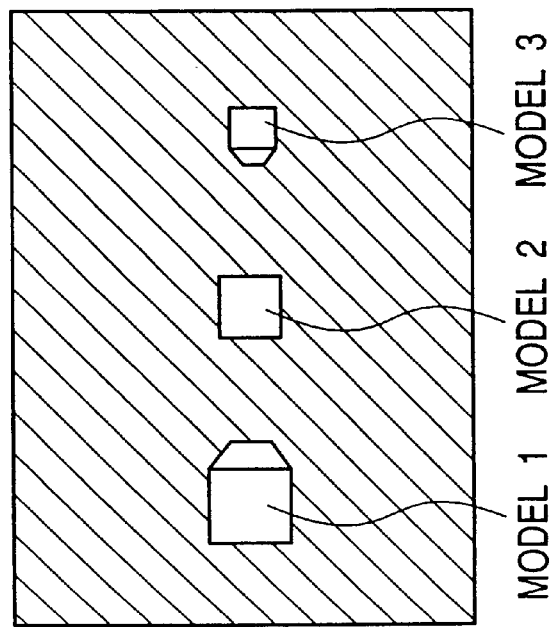
Figure 10B:
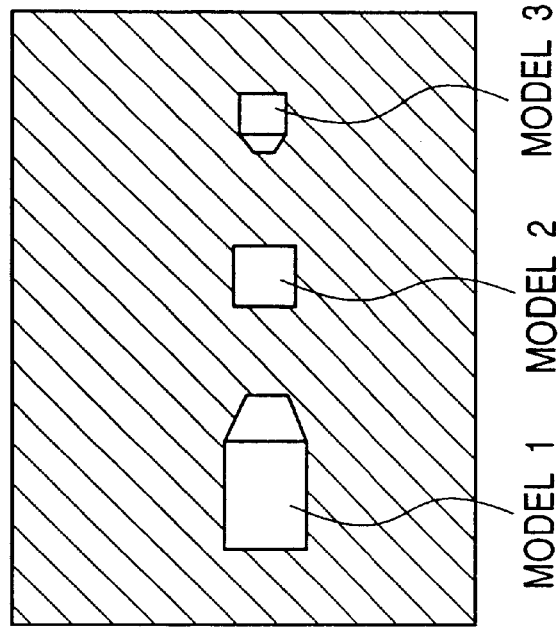
FIGS. 10A and 10B are diagrams illustrating projection to and images on the screen of the virtual reality system of the first embodiment.
Figure 10A:
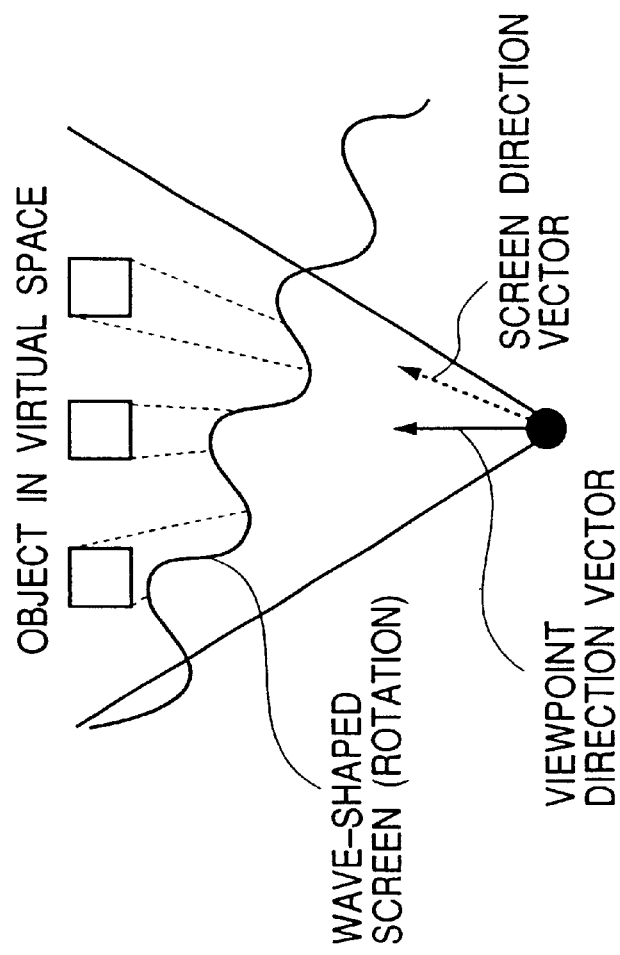
Figure 11B:
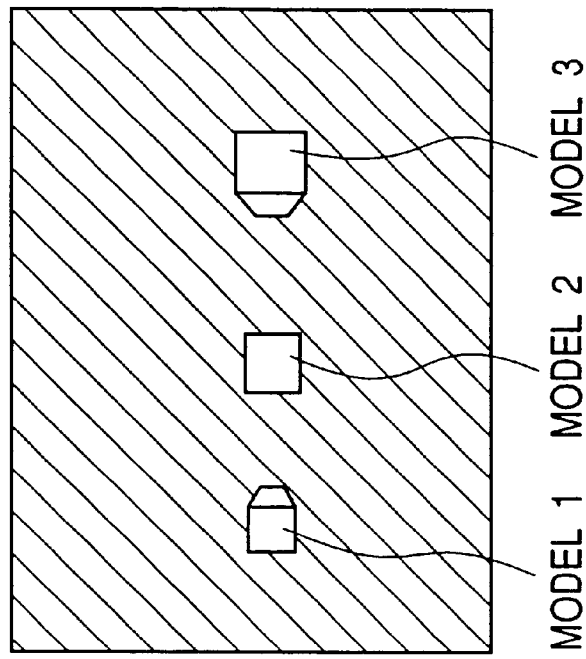
FIGS. 11A and 11B are diagrams illustrating projection to and images on the screen of the virtual reality system of the first embodiment.
Figure 11A:
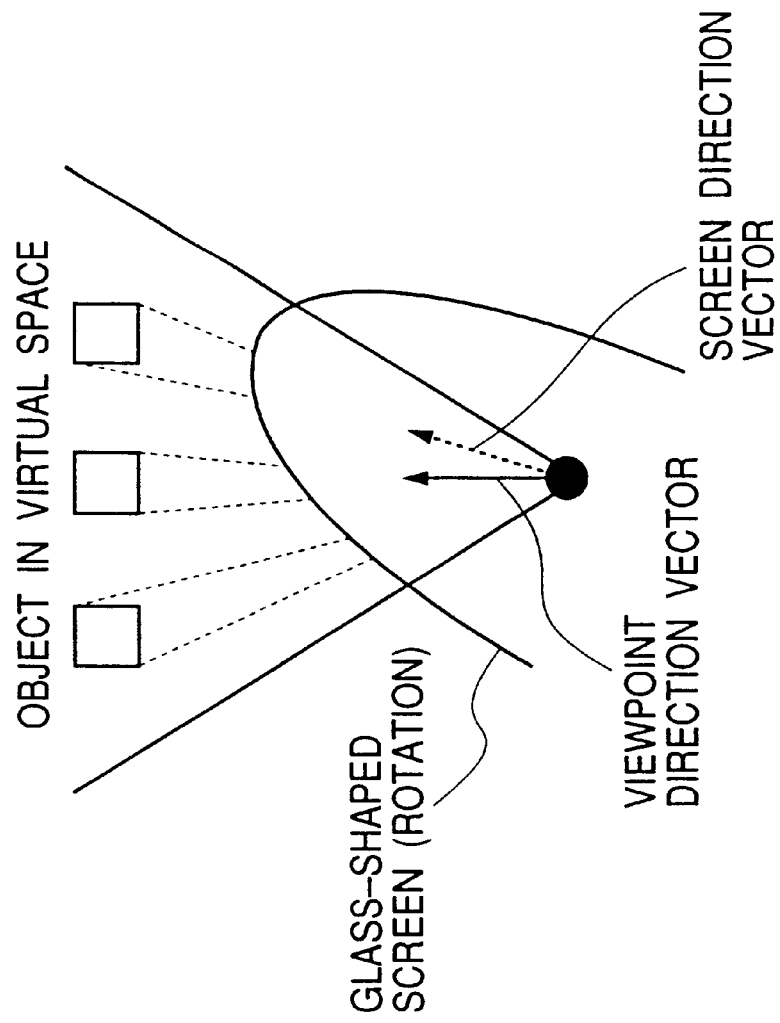

Next, at Step S308, upon reception of an instruction from the control apparatus 101, the viewpoint detection unit 111a of the viewpoint scouter 111 detects the viewpoint position data S(s, t) of the user 1 and stores the detected data in the memory apparatus 106. The viewpoint position data S indicates the position, by using as the reference point the upper left vertex of the visual field (horizontal and vertical lengths of a and b) of the video display unit 111b of the viewpoint input scouter 111 as shown in FIG. 6.

Next, at Step S309, a deviation angle of the viewpoint direction relative the head direction of the user 1 is calculated. Specifically, upon reception of an instruction from the control apparatus 101, the operation apparatus 105 calculates the deviation angles ($\alpha$, $\beta$) in the vertical and horizontal directions by the following equations (9) and (10) through correspondence between the visual field of the viewpoint input scouter 111 shown in FIG. 6 and the near clipping plane of the viewpoint in the virtual space shown in FIG. 7. The calculated deviation angles are stored in the memory apparatus 106.

$$\alpha = \arctan(1x/h) \quad (9)$$

$$\beta = \arctan(1y/h) \quad (10)$$

where 1x and 1y are given by the following equations (11) and (12), and h is a distance between the viewpoint and the near clop plane.

$$1x = (m/a) \cdot (s - a/s) \quad (11)$$

$$1y = (n/b) \cdot (t - b/t) \quad (12)$$

Next, at Step S310 a process of moving the viewpoint (camera) in the virtual space is performed. During this process, the direction of the viewpoint (camera) is corrected.

Specifically, upon reception of an instruction from the control apparatus 101, the operation apparatus performs a conversion into the direction vector v'=(p, q, r) (world coordinate) by the following equation (13) by using the rotation angle (pitch, yaw, roll)=($\beta$, $\alpha$, $\gamma$) of the head of the user 1 stored in the memory apparatus 106.

$$v' = Ax \cdot Ay \cdot Az \cdot v \quad (13)$$

where v is a unit vector (0, 0, −1) in the z-axis, and Ax·Ay·Az is a matrix (3×3) representative of rotations about the x-, y- and z-axes. The matrix is given by:

$$\begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ \sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix}$$

Next, the operation apparatus 105 sets the position of the viewpoint (camera) in the virtual space to (x, y, z), and the direction to (p', q', r').

Next, at Step S311 a rotation process of the screen (picture plane) is performed. Specifically, upon reception of an instruction from the control apparatus 101, the operation apparatus 105 first calculates a new vector v" (screen direction vector) which is the viewpoint vector at Step S310 rotated by the deviation angle at Step S309. Next, a screen (presently selected screen) is set at the position spaced from the viewpoint position by the variable W in the direction indicated by the screen direction vector.

Next, at Step S312, a mapping process over the screen is performed. Specifically, upon reception of an instruction from the control apparatus 101, the data of the model 1 to 4 set in the virtual space is mapped through one point central projection.

FIGS. 8A and 8B to 11A and 11B illustrate projection of the model onto each screen (with the viewpoint above the objects). In FIGS. 8A and 8B to 11A and 11B, the model 4 is omitted.

Next, at Step S313 the final image is calculated. Specifically, upon reception of an instruction from the control apparatus 101, the operation apparatus 105 maps the scene to be projected on an effective area of the screen, over the video memory apparatus 107 (device coordinate system). It is assumed that the mapping stores an optional distance in the effective area of the screen in the device coordinate system (the details being-omitted). The screen effective area is assumed to be an area in the screen cut with a viewing volume (assuming that the screen has a sufficient area to be cut with the viewing volume).

FIGS. 8B, 9B, 10B, and 11B show the images on the video memory apparatus 107 mapped from the screens shown in FIGS. 8A, 9A, 10A, and 11A (the model 4 is omitted in FIGS. 8A and 8B to 11A to 11B).

Next, at Step S314 the image is displayed on the side of the user 1. Specifically, upon reception of an instruction from the control apparatus 101, the image in the video memory apparatus 107 is transmitted via the video conversion apparatus 109 to the video display unit 111b of the viewpoint input scouter 111. The user 1 mounted with the viewpoint input scouter 111 can view the scenes shown in FIGS. 8B, 9B, 10B, and 11B on the selected screen.

After the process at Step S314 is completed, the flow returns to Step S305.

In the first embodiment, although the 3D sensor (position/direction sensor) is used in the virtual reality system, the invention is not limited thereto.

Next, the second embodiment of the invention will be described with reference to FIGS. 12 to 14A and 14B and with reference to FIGS. 1 and 2 of the first embodiment having the same structure of the virtual reality system of the second embodiment.

Figure 12:
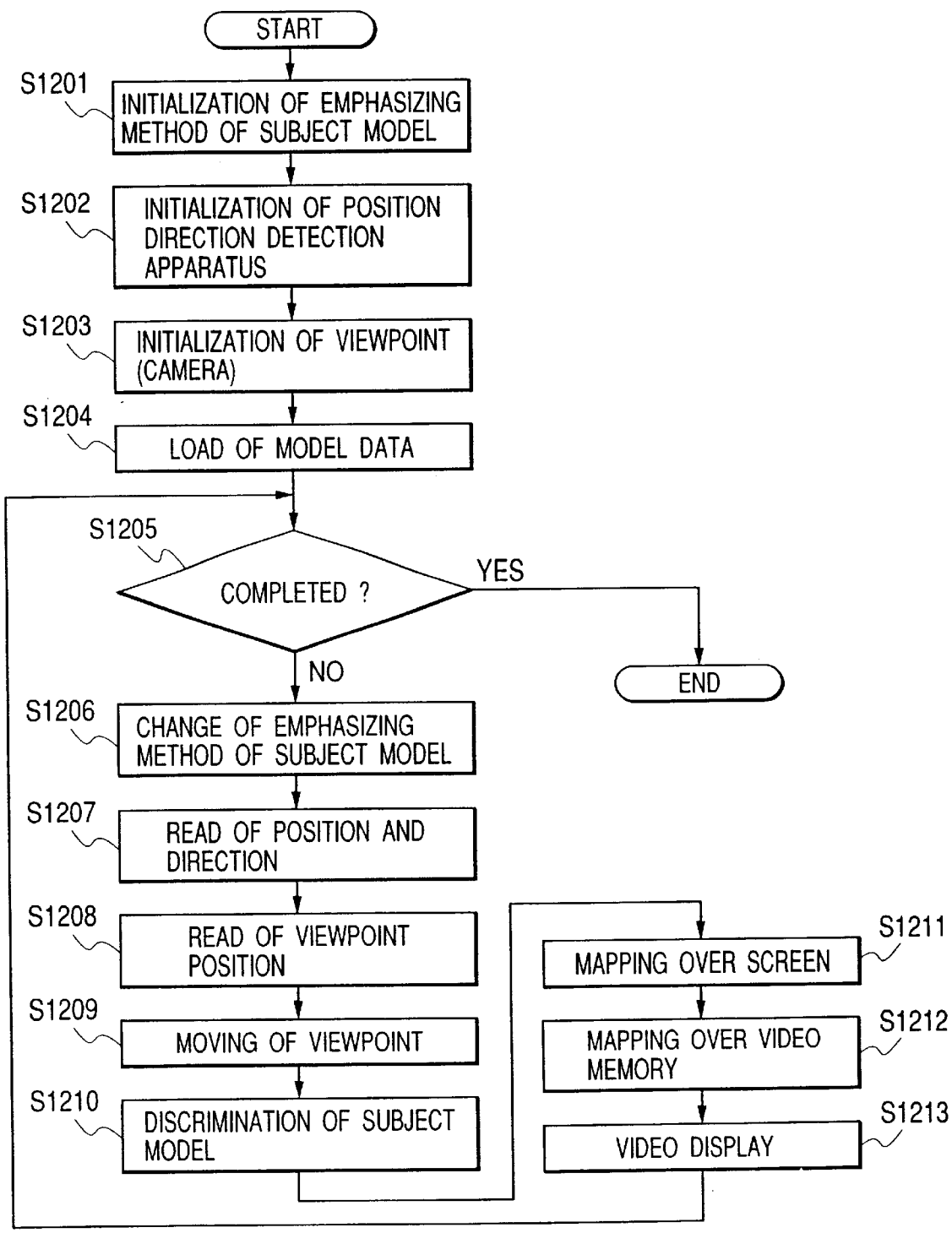
FIG. 12 is a flow chart illustrating the operation of a VR simulation process to be executed by a virtual reality system according to a second embodiment of the invention.

FIG. 12 is a flow chart illustrating the operation of the VR simulation to be executed by the virtual reality system of the second embodiment. In the second embodiment, although the screen (picture plane) set in the 3D virtual space is a rectangular plane fixed relative to the viewpoint (camera), the invention is not limited thereto.

As a user of this virtual reality system instructs a program start with the command input apparatus 103 or mouse, the VR simulation process starts.

Figure 13:
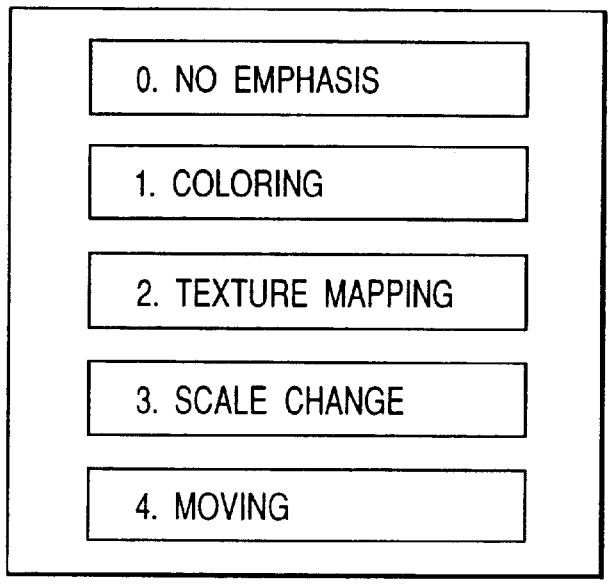
FIG. 13 is a diagram showing a menu when a subject model emphasizing method is selected in the virtual reality system of the second embodiment.

At Step S1201, an emphasizing method of a subject model is initialized. Namely, upon reception of an instruction from the control apparatus 101, the data display apparatus 108 displays a menu such as shown in FIG. 13. The user selects a desired emphasizing method from the character strings displayed on the data display apparatus 108 with the command input apparatus 103 or mouse (although a plurality of emphasizing methods may be selected, only both of "1. coloring" (color change) and "2. texture mapping" (texture change), shown in FIG. 2, can not selected simultaneously), and thereafter depresses an unrepresented OK button. At this time, the selected emphasizing method is stored in the memory apparatus 106. Although a plurality of emphasizing methods can be selected, the coloring 1 and the texture mapping 2 shown in FIG. 13 cannot be selected at the same time. In this embodiment, although designating the detailed contents of each emphasizing method is not executed for the simplicity of description, the invention is not limited thereto. The detailed contents may be a color value to be caused by a color change, a texture image and mapping method to be caused by the texture change, a presence/absence of a magnification factor or a variable magnification to be caused by a scale change, and motion contents (rotation, vibration and the like) of a motion designation.

Next, at Step S1202 the position/direction detection apparatus 110 is initialized. Specifically, the user 1 of the virtual reality system stands upright at a proper position and looks at the front, with the viewpoint input scouter 111 and position/direction detection apparatus 110 being mounted. In this state, as the user instructs with the command input apparatus 103 or mouse, the position/direction detection apparatus 110 initializes the position and direction to an origin (0.0, 0.0, 0.0) and an original rotation angle (0.0, 0.0, 0.0) without rotation.

Next, at Step S1203 upon reception of an instruction from the control apparatus 101, the operation apparatus 105 initializes the viewpoint (camera) to be set in the 3D virtual space, for example, to a position (0.0, 1.0, 0.0), a direction (0.0, 0.0, −1.0) (direction vector), and a view angle (0.8, 0.6) (horizontal and vertical).

Next, at Step S1204 model data is loaded. Specifically, the control apparatus 101 reads the data from four model files (model 1 to model 4) stored in advance in the file apparatus 104, and loads the read data into the memory apparatus 106. It is assumed that each model data is written with the above-described coordinate value and plane loop data (the initial position of the model in the virtual space is added to the last of each model file). The models 1 to 4 have the following data by way of example.

Model 1
Coordinate Value Data
8 1:(−0.5, 0.5, 0.5), 2:(0.5, 0.5, 0.5), 3:(0.5, 0.5, −0.5), 4:(−0.5, 0.5, 0.5), 5:(−0.5, −0.5, 0.5), 6:(0.5, −0.5, −0.5), 7:(0.5, −0.5, 0.5), 8:(−0.5, −0.5, 0.5)
Plane Loop Data
6 (41234), (45876), (41562), (44378), (41485), (42673) (0.0, 1.0, −2.0)→initial value
Model 2
8 1:(−0.5, 0.5, 0.5), 2:(0.5, 0.5, −0.5), 3:(0.5 0.5, −0.5), 4:(−0.5, 0.5, 0.5), 5:(−0.5, −0.5, 0.5), 6:(0.5, −0.5, −0.5), 7:(0.5, −0.5, 0.5), 8:(−0.5, −0.5, 0.5)
6 (41234), (45876), (41562), (44378), (41485), (42673) (0.0, 1.0, −2.6)→initial value
Model 3
Coordinate Value Data
8 1:(−0.5, 0.5, 0.5), 2:(0.5, 0.5, 0.5), 3:(0.5, 0.5, −0.5), 4:(−0.5, 0.5, −0.5), 5:(−0.5, −0.5, 0.5), 6:(0.5, −0.5, −0.5), 7:(0.5, −0.5, 0.5), 8:(−0.5, −0.5, 0.5)
Plane Loop Data
6 (41234), (45876), (41562), (44378), (41485), (42673) (0.0, 1.0, −2.0)→initial value
Model 4
4 (−5.0, 0.0, 0.0), (5.0, 0.0, 0.0), (5.0, 0.0, −10.0), (−5.0, 0.0, −10.0)
1 (42341) (0.0, 1.0, −5.0)→initial value Next, at Step S1205 upon reception of an instruction from the control apparatus 101, the command input apparatus 103 or mouse judges whether the user instructs an end of the VR simulation. If there is such an instruction, the VR simulation is terminated, whereas if not, the flow advances to Step S1206.

At this Step S1206, the emphasizing method of a subject model is changed. Specifically, according to a command of the control apparatus 101, the command input apparatus 103 or mouse judges whether the user instructs a change of the emphasizing method. If there is such an instruction, the emphasizing method is again designated by the-process at Step S1201, whereas if not, the flow advances to Step S1207 without doing nothing.

Next, at Step S1207 upon reception of an instruction from the control apparatus 101, the position/direction detection apparatus 110 detects the position (x, y, z) and rotation angle (pitch, yaw, roll) of the head 1005 of the user 1, and stores the detected data in the memory apparatus 106.

Next, at Step S1208, upon reception of an instruction from the control apparatus 101, the viewpoint detection unit 111a of the viewpoint scouter 111 detects the viewpoint position data S(s, t) of the user 1 and stores the detected data in the memory apparatus 106. The viewpoint position data S indicates the position by using as the reference point the upper left vertex of the visual field (horizontal and vertical lengths of a and b) of the video display unit 111b of the viewpoint input scouter 111 as shown in FIG. 6.

Next, at Step S1209, a process of moving the viewpoint (camera) in the virtual space is performed. Specifically, upon reception of an instruction from the control apparatus 101, the operation apparatus 10 performs a conversion into the direction vector v'=(p, q, r) (world coordinate) by the following equation (13) by using the rotation angle (pitch, yaw, roll)=($\beta$, $\alpha$, $\gamma$) of the head of the user 1 stored in the memory apparatus 106.

$$v' = Ax \cdot Ay \cdot Az \cdot v \qquad (13)$$

where v is a unit vector (0, 0, −1) in the z-axis, and Ax·Ay·Az is a matrix (3×3) representative of rotations about the x-, y- and z-axes. The matrix is given by:

$$\begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ \sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix}$$

Next, the operation apparatus 105 sets the position of the viewpoint (camera) in the virtual space to (x, y, z) and the direction to (p', q', r').

Next, at Step S1210, a subject model in the 3D virtual space corresponding to the viewpoint of the user is identified. Specifically, upon reception of an instruction from the control apparatus 101, the operation apparatus 105 judges whether there is a mapping model at the viewpoint position S(s, t) obtained at Step S1208, basing upon inverse conversion of mapping the 3D model over the screen. If there is the mapping model, an ID (1 to 4) of this model is substituted into a variable z (indicating ID of the subject model), whereas if not, "0" is substituted into the variable. Since inverse conversion of mapping the 3D model over the screen is well known so that the description thereof is omitted for the simplicity of description.

Next, at Step S1211, a mapping process over the screen is performed. Specifically, upon reception of an instruction from the control apparatus 101, the data of the models 1 to 4 set in the virtual space is mapped through one point central projection. In this case, the mapping process over the screen is executed, if z>0, by emphasizing the model indicated by the variable z with the presently selected emphasizing method without changing the other models. If z=0, none of the models are changed and the mapping process over the screen (picture plane) is executed.

Next, at Step S1212 the final image is calculated. Specifically, upon reception of an instruction from the control apparatus 101, the operation apparatus 105 maps the scene to be projected on the screen over the video memory apparatus 107 (device coordinate system).

Next, at Step S1213 the image is displayed on the side of the user 1. Specifically, upon reception of an instruction from the control apparatus 101, the image in the video memory apparatus 107 is transmitted via the video conversion apparatus 109 to the video display unit 111b of the viewpoint input scouter 111. The user 1 mounted with the viewpoint input scouter 111 can view the scene shown in FIG. 14B in which the scale of the model 3 is enlarged and the model 4 is omitted for the simplicity of the drawing.

After the process at Step S1213 is completed, the flow returns to Step S1205.

Next a storage medium as the third embodiment of the present invention will be described with reference to FIGS. 15 and 16.

Figure 15:
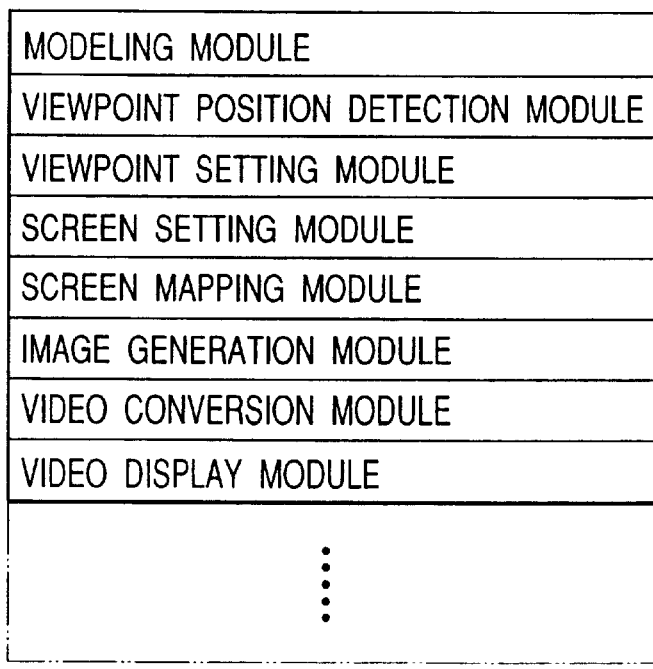
FIG. 15 is a diagram showing program modules of a program stored in a storage medium.
Figure 14B:
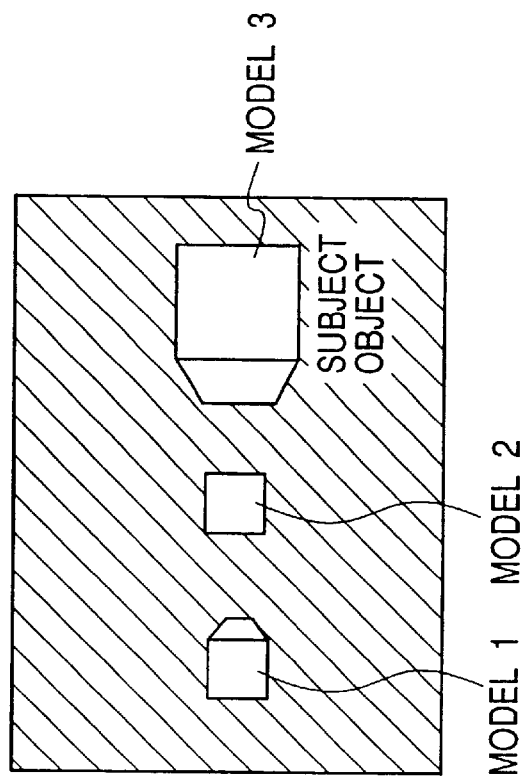
FIGS. 14A and 14B are diagrams illustrating projection to and images on the screen of the virtual reality system of the second embodiment.
Figure 14A:
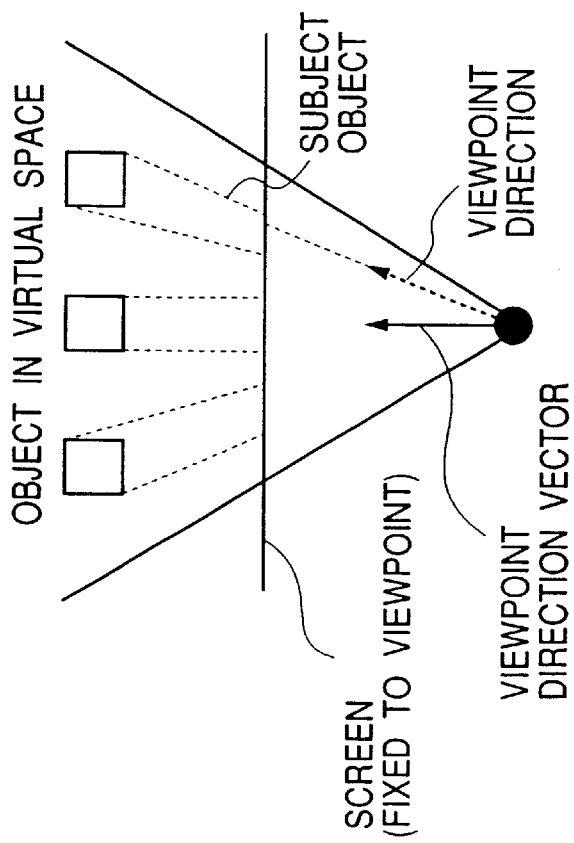

As shown in FIG. 15, in a storage medium storing a program for controlling the virtual reality system realizing virtual reality simulation, the program has at least a "modeling module", a "viewpoint position detection module", a "viewpoint setting module", a "screen setting module", a "screen mapping module", an "image generation module", a "video conversion module", and a "video display module".

The "modeling module" is a program module for configuring 3D shape (model) data of an object. The "viewpoint position detection module" is a program module for detecting the viewpoint of the user. The "viewpoint setting module" is a program module for setting the viewpoint (camera) in the 3D virtual space. The "screen setting module" is a program module for setting the screen (picture plane) in the virtual space in accordance with the viewpoint position data detected by the viewpoint position detection module. The "screen mapping module" is a program module for mapping a scene over the screen which is formed by the model data of the object viewed at the viewpoint set by the viewpoint setting module, while the spatial and geometrical position is taken into consideration. The "image generation module" is a program module for mapping the scene, which is mapped over the screen by the screen mapping module, over the device coordinate system. The "video conversion module" is a program module for converting an image formed by the image generation module into a video signal. The "video display module" is a program module for displaying the image converted by the video conversion module.

The viewpoint setting module sets the viewpoint in accordance with the position and direction data detected by the viewpoint position detection module. The video display module displays an image on the display placed in front of the user and fixed to the head of the user.

Figure 16:
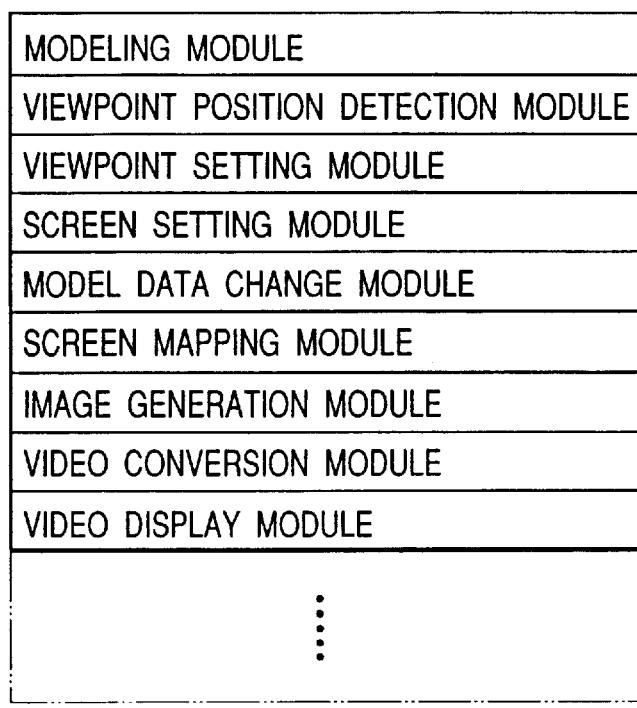
FIG. 16 is a diagram showing program modules of a program stored in another storage medium.
Figure 17:
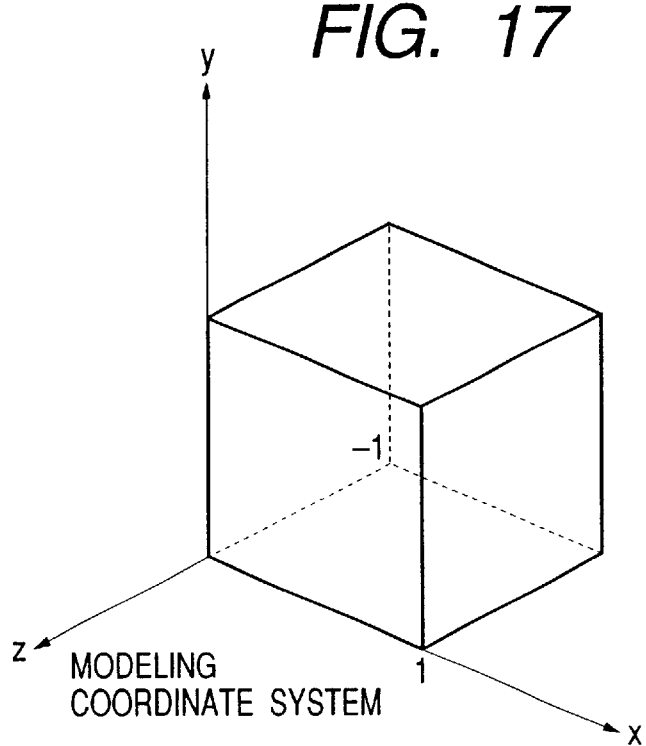
FIG. 17 is a diagram showing a three-dimensional object in a general modeling coordinate system.
Figure 19:
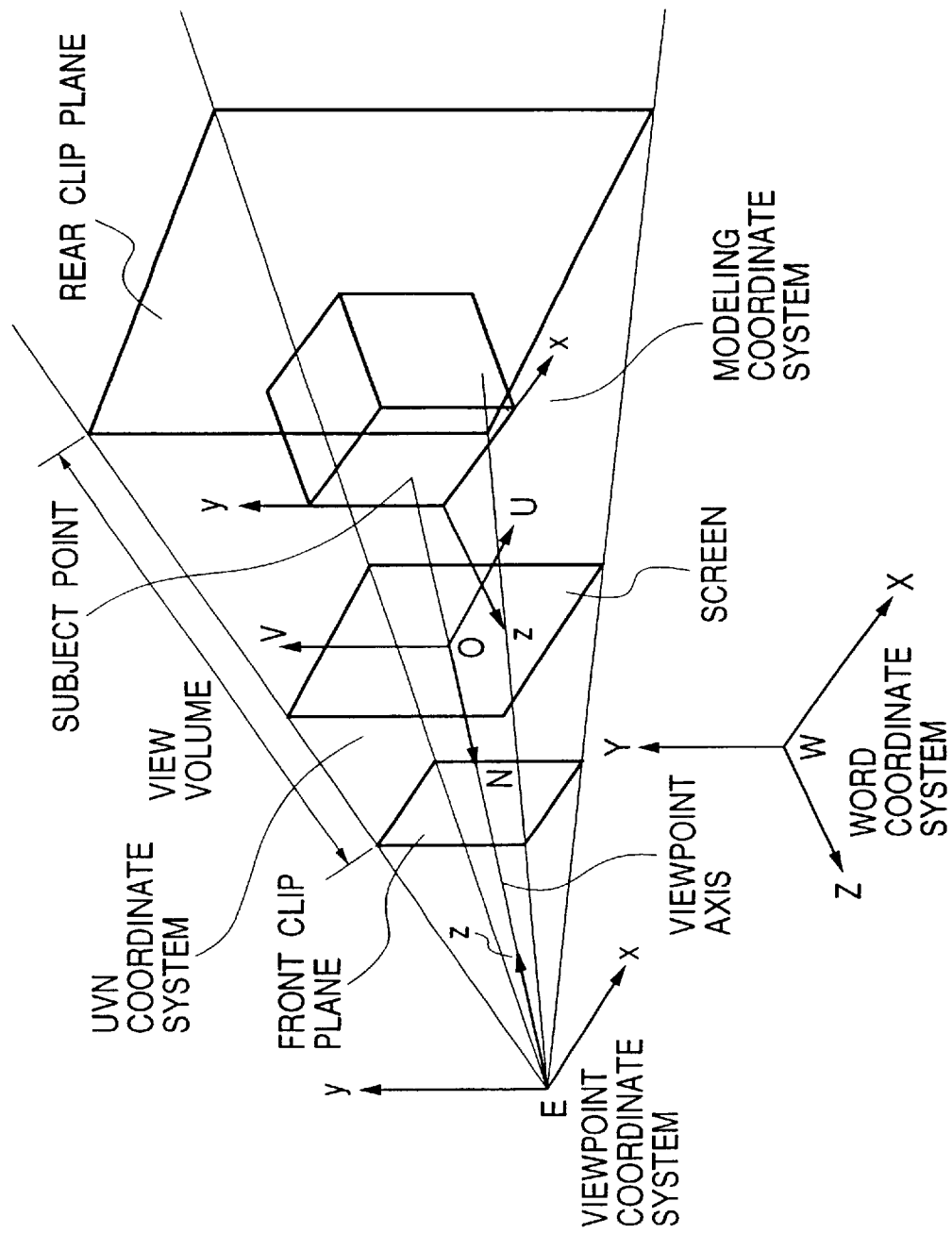
FIG. 19 is a diagram showing four coordinate systems used for general projection conversion.
Figure 20:
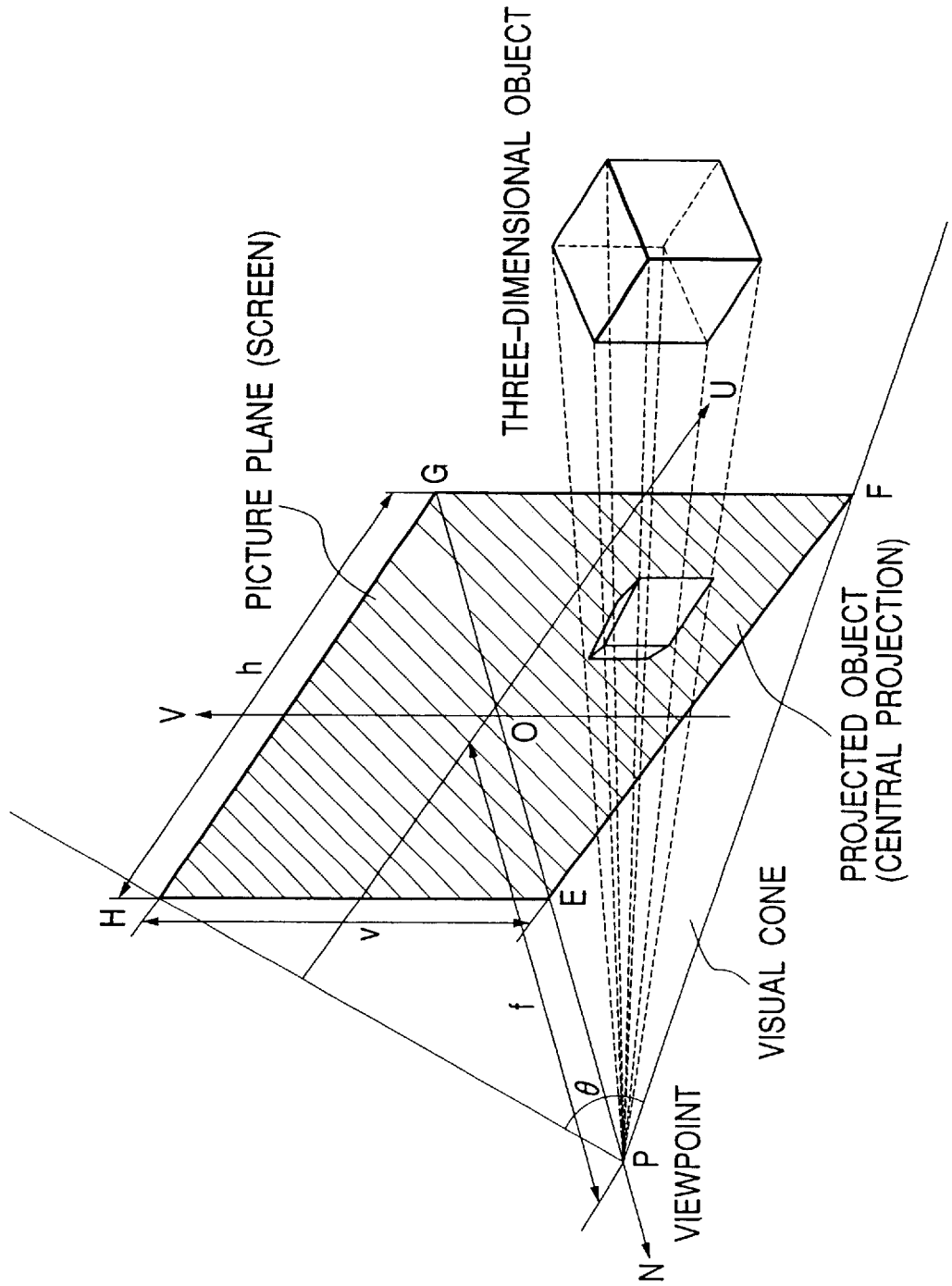
FIG. 20 is a diagram illustrating general projection conversion.
Figure 21:
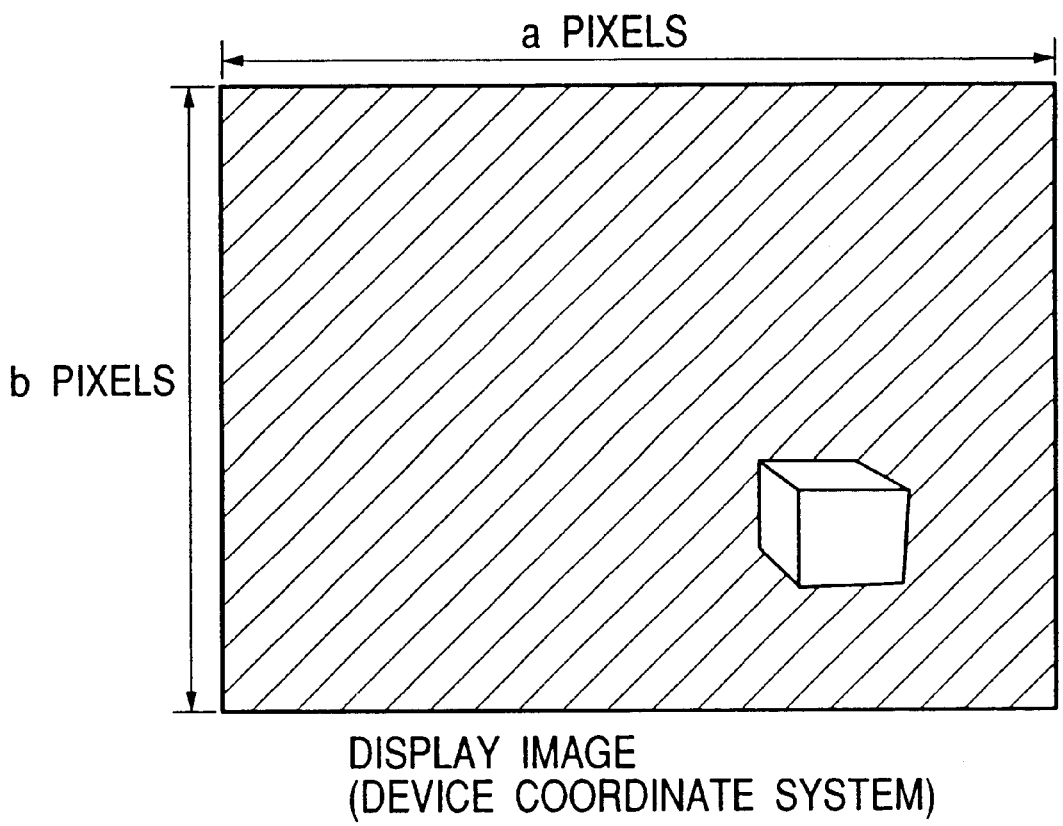
FIG. 21 is a diagram showing an example of a displayed image projected from a general screen.
Figure 22:
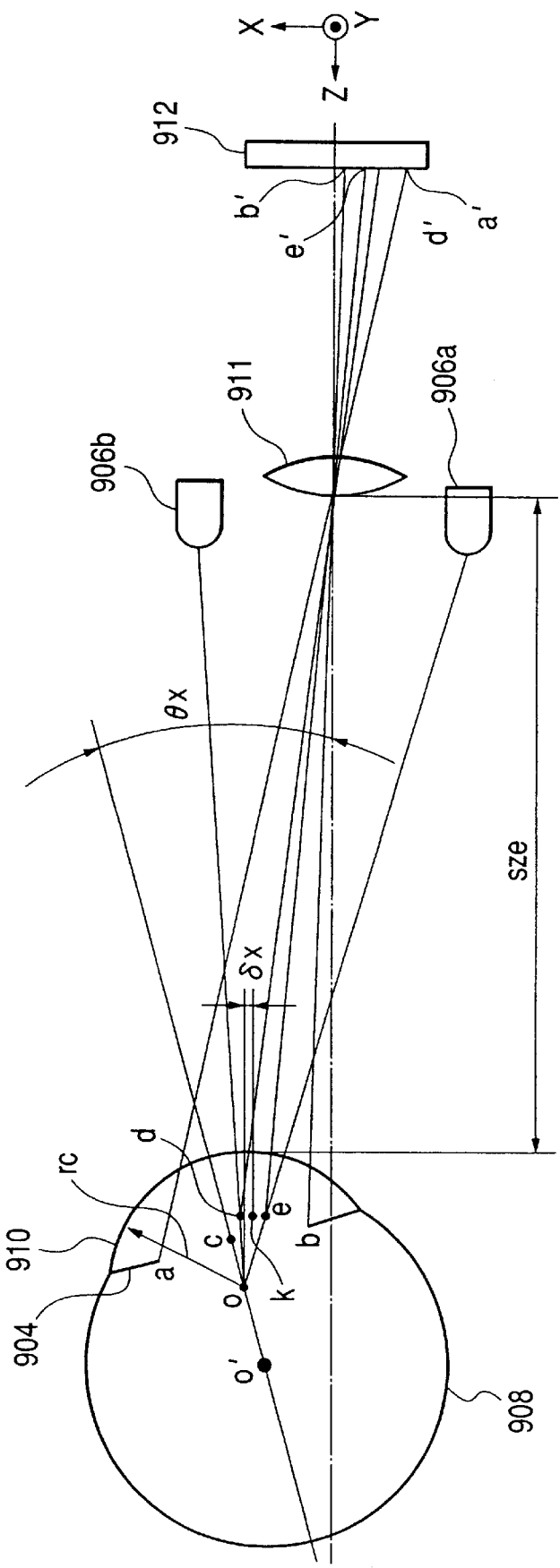
FIG. 22 is a plan view illustrating a general viewpoint detecting method.
Figure 23:
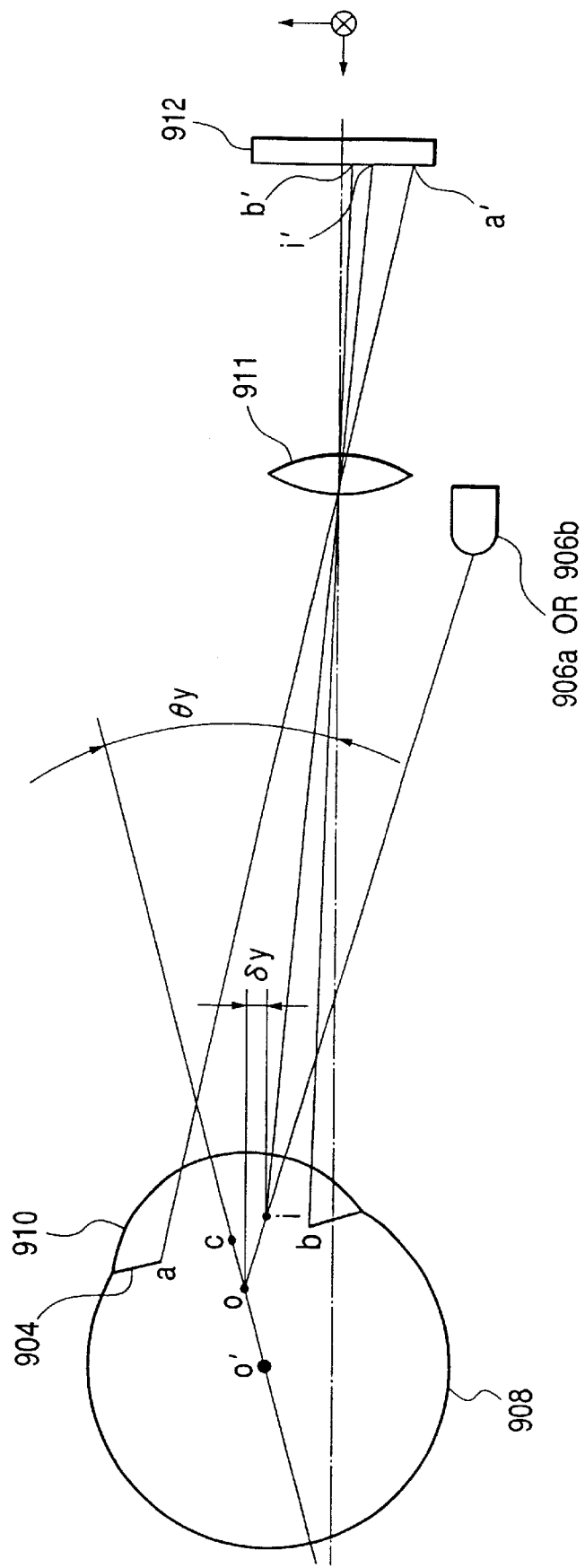
FIG. 23 is a side view illustrating the general viewpoint detecting method.
Figure 24:
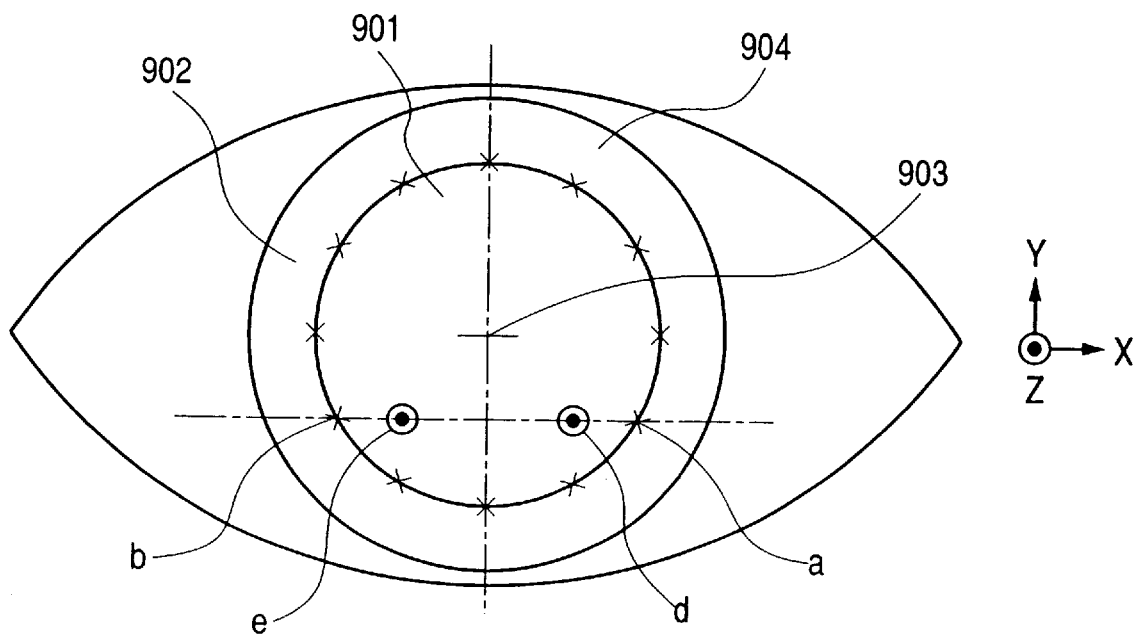
FIG. 24 is a schematic diagram showing an eyeball image projected on an image sensor of a general virtual reality system.
Figure 25:
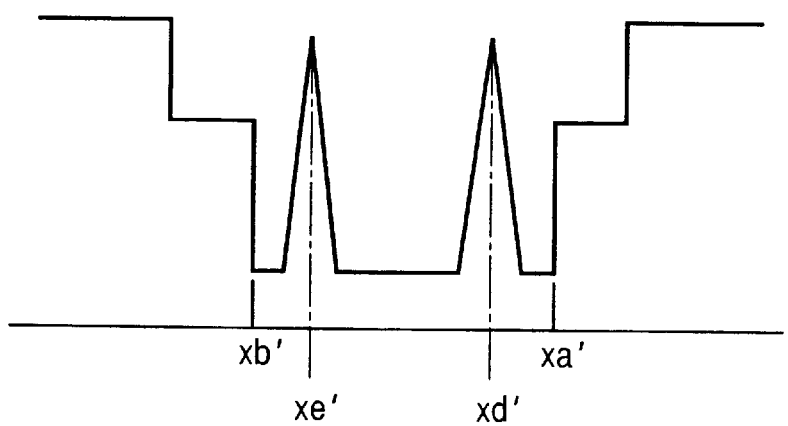
FIG. 25 is a diagram showing an output intensity of the image sensor of the general virtual reality system.
Figure 26:
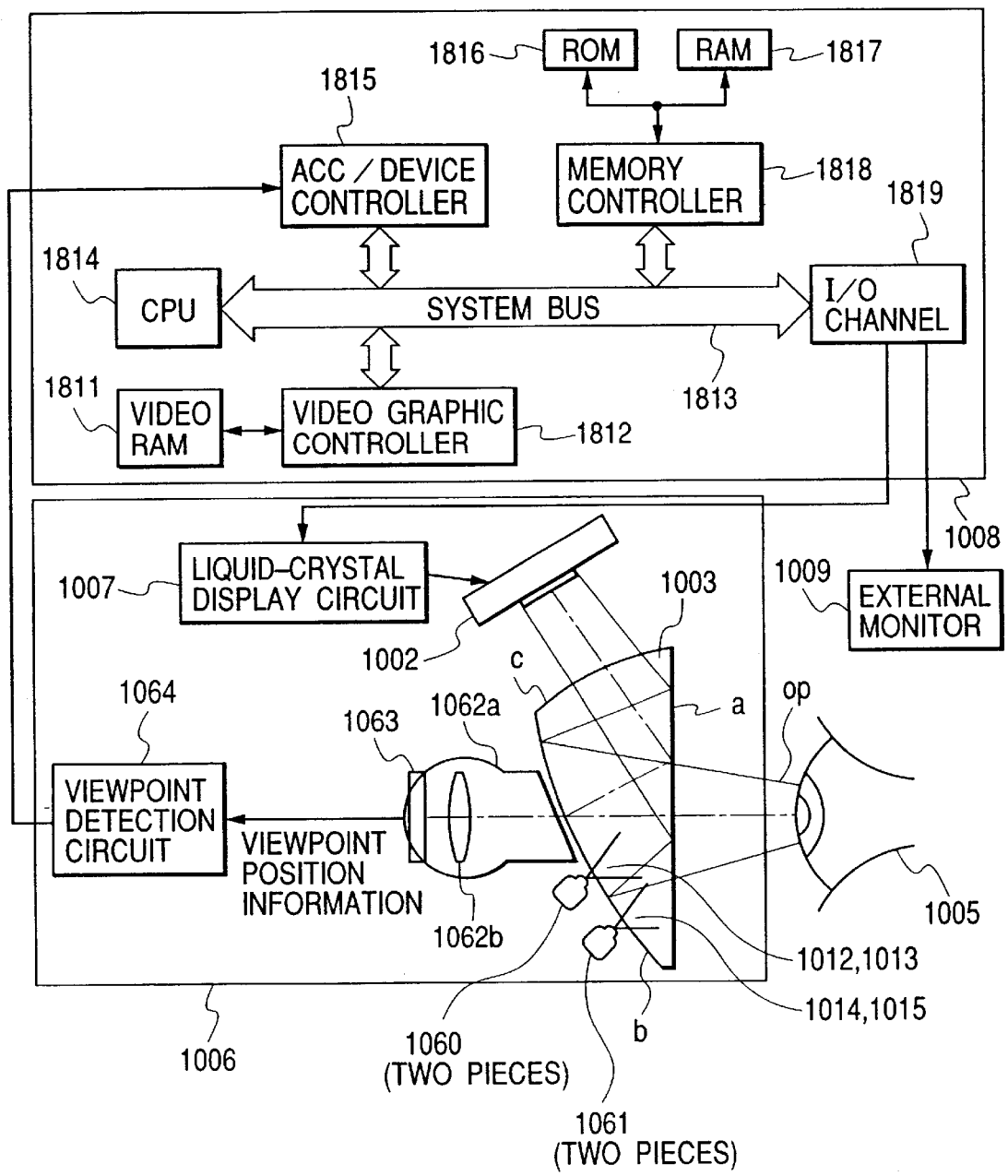
FIG. 26 is a schematic diagram showing an example of the structure of a personal computer system having a general viewpoint detecting function.
Figure 27:
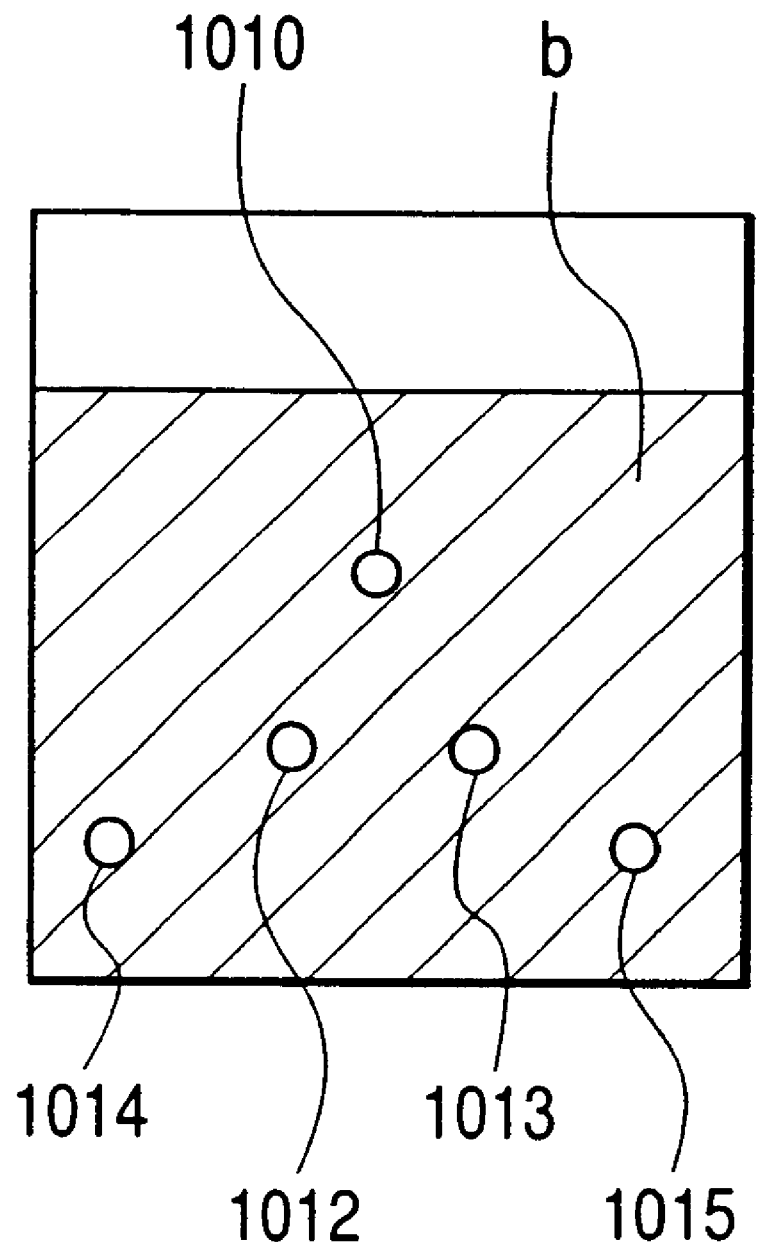
FIG. 27 is a diagram showing a prism of the personal computer system having the general viewpoint detecting function.

As shown in FIG. 16, in another storage medium storing a program for controlling the virtual reality system realizing virtual reality simulation, the program has at least a "modeling module", a "viewpoint position detection module", a "viewpoint setting module", a "screen setting module", a "model data change module", a "screen mapping module", an "image generation module", a "video conversion module", and a "video display module".

The "modeling module" is a program module for configuring 3D shape (model) data of an object. The "viewpoint position detection module" is a program module for detecting the viewpoint of the user. The "viewpoint setting module" is a program module for setting the viewpoint (camera) in the 3D virtual space. The "screen setting module" is a program module for setting the screen (picture plane) in the virtual space in accordance with the viewpoint position data detected by the viewpoint position detection module. The "model data change module" is a program module for changing the model data in accordance with the viewpoint position data detected by the viewpoint position detection module. The "screen mapping module" is a program module for mapping a scene over the screen which is formed by the model data of the object viewed at the viewpoint set by the viewpoint setting module, while the spatial and geometrical position is taken into consideration. The "image generation module" is a program module for mapping the scene, which is mapped over the screen by the screen mapping module, over the device coordinate system. The "video conversion module" is a program module for converting an image formed by the image generation module into a video signal. The "video display module" is a program module for displaying the image converted by the video conversion module.

The viewpoint setting module sets the viewpoint in accordance with the position and direction data detected by the viewpoint position detection module. The video display module displays an image on the display placed in front of the user and fixed to the head of the user.

There are a plurality of model data change means for executing the model data change module. A plurality of model data change means may be selected at the same time, and the selection contents can be changed by an instruction of the user.

As detailed above, in accordance with the viewpoint position data of the user obtained by viewpoint detecting means, the screen set in the virtual space is dynamically moved. Accordingly, the spatial and geometrical image of an object can be made interesting as different from a real image. It is therefore possible to realize VR simulation having high artistic effect and entertainment.

The attributes (shape, size, color, texture, motion and the like) of a model projected at a viewpoint position of a user can be changed dynamically so that an intention of a user can be reflected immediately to emphasize the model. It is therefore possible to realize VR simulation having high artistic effect and entertainment.

After the viewpoint of a user is detected, the user can view a vivid image matching the scene on the display fixed in front of the user.

The shape of the screen set in the virtual space can be changed freely in response to an instruction from a user. Accordingly, the spatial and geometrical image of an object set in the virtual space can be changed.

It is also possible to change the emphasizing method of a model the user is concerned.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing method comprising:
a modeling step of configuring three-dimensional shape data of an object;
a viewpoint position detecting step of detecting a viewpoint position of a viewer;
a viewpoint setting step of setting a viewpoint in a three-dimensional space;
a screen setting step of setting a virtual screen in a virtual space in accordance with viewpoint position data detected at said viewpoint position detecting step;
an image mapping step of mapping a scene over the virtual screen, which scene is formed by model data of the object viewed at the viewpoint set at said viewpoint setting step while a spatial and geometrical position of the object is taken into consideration, and of varying visual properties of the scene by varying a shape of the virtual screen;
an image generating step of mapping the scene mapped on the virtual screen at said image mapping step, over a device coordinate system;
a converting step of converting an image generated at said image generating step into an image signal; and
a display step of displaying an image converted at said converting step.

2. An image processing method according to claim 1, wherein said display step displays the image on a display placed in front of the eyes of the viewer and fixed to the head of the viewer.

3. An image processing method according to claim 1, wherein the virtual screen has a desired shape, and the shape is changed in response to an instruction by the viewer.

4. An image processing system comprising:
modeling means for configuring three-dimensional shape data of an object;
viewpoint position detecting means for detecting a viewpoint position of a viewer;
viewpoint setting means for setting a viewpoint in a three-dimensional space;
screen setting means for setting a virtual screen in a virtual space in accordance with viewpoint position data detected by said viewpoint position detecting means;
image mapping means for mapping a scene over the virtual screen, which scene is formed by model data of the object viewed at the viewpoint set by said viewpoint setting means while a spatial and geometrical position of the object is taken into consideration, and of varying visual properties of the scene by varying a shape of the virtual screen;
image generating means for mapping the scene mapped on the virtual screen by said image mapping means, over a device coordinate system;
converting means for converting an image generated by said image generating means into an image signal; and
display means for displaying an image converted by said converting means.

5. An image processing system according to claim 4, wherein said display means displays the image on a display placed in front of the eyes of the viewer and fixed to the head of the viewer.

6. An image processing system according to claim 4, wherein the virtual screen has a desired shape, and the shape is changed in response to an instruction by the viewer.

7. An image processing method comprising:
a modeling step of configuring three-dimensional shape data of an object;
a viewpoint position detecting step of detecting a viewpoint position of a viewer;
a viewpoint setting step of setting a viewpoint in a three-dimensional space;
a screen setting step of setting a virtual screen in a virtual space in accordance with viewpoint position data detected at said viewpoint position detecting step;
a model data changing step of changing model data in accordance with the viewpoint position data detected at said viewpoint detection step;
an image mapping step of mapping a scene over the virtual screen, which scene is formed by the model data of the object viewed at the viewpoint set at said viewpoint setting step while a spatial and geometrical position of the object is taken into consideration, and of varying visual properties of the scene by varying a shape of the virtual screen;
an image generating step of mapping the scene mapped on the virtual screen at said image mapping step, over a device coordinate system;
a converting step of converting an image generated at said image generating step into an image signal; and
a display step of displaying an image converted at said converting step.

8. An image processing method according to claim 7, wherein said display step displays the image on a display placed in front of the eyes of the viewer and fixed to the head of the viewer.

9. An image processing method according to claim 7, wherein the virtual screen has a desired shape, and the shape is changed in response to an instruction by the viewer.

10. An image processing method according to claim 7, wherein there is a plurality of model data changing means for executing said model data changing step, a plurality of the model data changing means can be selected at the same time, and the selection contents can be changed in response to an instruction by the viewer.

11. An image processing system comprising:
modeling means for configuring three-dimensional shape data of an object;
viewpoint position detecting means for detecting a viewpoint position of a viewer;
viewpoint setting means for setting a viewpoint in a three-dimensional space;
screen setting means for setting a virtual screen in a virtual space in accordance with viewpoint position data detected by said viewpoint position detecting means;
model data changing means for changing model data in accordance with the viewpoint position data detected by said viewpoint detection means;
image mapping means for mapping a scene over the virtual screen, which scene is formed by the model data of the object viewed at the viewpoint set by said viewpoint setting means while a spatial and geometrical position of the object is taken into consideration, and of varying visual properties of the scene by varying a shape of the virtual screen;
image generating means for mapping the scene mapped on the virtual screen by said image mapping means, over a device coordinate system;

video converting means for converting an image generated by said image generating means into an image signal; and display means for displaying an image converted by said video converting means.

12. An image processing system according to claim 11, wherein said display means displays the image on a display placed in front of the eyes of the viewer and fixed to the head of the viewer.

13. An image processing system according to claim 11, wherein the virtual screen has a desired shape, and the shape is changed in response to an instruction by the viewer.

14. An image processing system according to claim 11, wherein a plurality of model data changing means are provided, a plurality of the model data changing means can be selected at the same time, and the selection contents can be changed in response to an instruction by the viewer.

15. A storage medium storing a program for controlling a virtual reality system realizing a virtual reality, the program comprising:

a modeling module for configuring three-dimensional shape data of an object;

a viewpoint position detecting module for detecting a viewpoint position of a viewer;

a viewpoint setting module for setting a viewpoint in a three-dimensional space;

a screen setting module for setting a virtual screen in a virtual space in accordance with viewpoint position data detected by said viewpoint position detecting module;

an image mapping module for mapping a scene over the virtual screen, which scene is formed by model data of the object viewed at the viewpoint set by said viewpoint setting module while a spatial and geometrical position of the object is taken into consideration, and of varying visual properties of the scene by varying a shape of the virtual screen;

an image generating module for mapping the scene mapped on the virtual screen by said image mapping module, over a device coordinate system;

a converting module for converting an image generated by said image generating module into an image signal; and a display module for displaying an image converted by said video converting module.

16. A storage medium according to claim 15, wherein said display module displays the image on a display placed in front of the eyes of the viewer and fixed to the head of the viewer.

17. A storage medium storing a program for controlling a virtual reality system realizing a virtual reality, the program comprising:

a modeling module for configuring three-dimensional shape data of an object;

a viewpoint position detecting module for detecting a viewpoint position of a viewer;

a viewpoint setting module for setting a viewpoint in a three-dimensional space;

a screen setting module for setting a virtual screen in a virtual space in accordance with viewpoint position data detected by said viewpoint position detecting module;

a model data changing module for changing model data in accordance with the viewpoint position data detected by said viewpoint detection module;

an image mapping module for mapping a scene over the virtual screen, which scene is formed by the model data of the object viewed at the viewpoint set by said viewpoint setting module while a spatial and geometrical position of the object is taken into consideration, and of varying visual properties of the scene by varying a shape of the virtual screen;

an image generating module for mapping the scene mapped on the virtual screen by said screen mapping module, over a device coordinate system;

a converting module for converting an image generated by said image generating module into an image signal; and a signal module for displaying an image converted at said video converting module.

18. A storage medium according to claim 17, wherein said display module displays the image on a display placed in front of the eyes of the viewer and fixed to the head of the viewer.

19. A storage medium according to claim 17, wherein there is a plurality of model data changing means for executing said model data changing module, a plurality of the model data changing means can be selected at the same time, and the selection contents can be changed in response to an instruction by the viewer.

* * * * *

UNITED STATES PATENT AND TRADEMARK OFFICE
CERTIFICATE OF CORRECTION

PATENT NO.    : 6,400,364 B1
DATED         : June 4, 2002
INVENTOR(S)   : Hirokazu Akisada et al.

It is certified that error appears in the above-identified patent and that said Letters Patent is hereby corrected as shown below:

<u>Title page,</u>
Item [57], ABSTRACT,
Line 3, "virtual the" should read -- virtual space. The --.

<u>Column 15,</u>
Line 7, "mouse (although a plurality of" should read -- mouse --; and
Lines 8-10, should be deleted.

<u>Column 16,</u>
Line 25, "head 1005" should read -- head --.

<u>Column 19,</u>
Line 50, "of" should read -- for --.

<u>Column 20,</u>
Line 63, "of" should read -- for --.

<u>Column 21,</u>
Line 34, "of" should read -- for --.

<u>Column 22,</u>
Line 25, "of" should read -- for --; and
Line 28, "screen" should read -- image --.

Signed and Sealed this

Third Day of December, 2002

JAMES E. ROGAN
*Director of the United States Patent and Trademark Office*